United States Patent
Gleitman

(10) Patent No.: US 9,441,477 B2
(45) Date of Patent: *Sep. 13, 2016

(54) MULTIPLE DISTRIBUTED PRESSURE MEASUREMENTS

(71) Applicant: Halliburton Energy Services, Inc., Houston, TX (US)

(72) Inventor: Daniel D. Gleitman, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/903,377

(22) Filed: May 28, 2013

(65) Prior Publication Data

US 2013/0256033 A1  Oct. 3, 2013

Related U.S. Application Data

(63) Continuation of application No. 11/051,762, filed on Feb. 4, 2005.

(60) Provisional application No. 60/550,033, filed on Mar. 4, 2004.

(51) Int. Cl.
| | |
|---|---|
| G06G 7/48 | (2006.01) |
| E21B 47/06 | (2012.01) |
| E21B 17/02 | (2006.01) |
| E21B 44/00 | (2006.01) |
| E21B 47/00 | (2012.01) |
| E21B 47/01 | (2012.01) |
| E21B 49/00 | (2006.01) |

(52) U.S. Cl.
CPC .......... *E21B 47/06* (2013.01); *E21B 17/028* (2013.01); *E21B 44/00* (2013.01); *E21B 47/00* (2013.01); *E21B 47/01* (2013.01); *E21B 49/003* (2013.01)

(58) Field of Classification Search
USPC .......................................................... 703/10
See application file for complete search history.

(56) References Cited

U.S. PATENT DOCUMENTS

| | | |
|---|---|---|
| 3,223,184 A | 12/1965 | Jones et al. |
| 3,827,294 A | 8/1974 | Anderson |
| 3,846,986 A | 11/1974 | Anderson |
| 4,273,212 A | 6/1981 | Dorr et al. |

(Continued)

FOREIGN PATENT DOCUMENTS

| | | |
|---|---|---|
| GB | 2235540 A | 3/1991 |
| WO | 02/06634 A1 | 1/2002 |

(Continued)

OTHER PUBLICATIONS

International Search Report issued in related PCT Application No. PCT/US2005/07082 mailed Sep. 20, 2007, 5 pages.

(Continued)

*Primary Examiner* — Saif Alhija
(74) *Attorney, Agent, or Firm* — Alan Bryson; Baker Botts L.L.P.

(57) ABSTRACT

Methods, computer programs, and systems for detecting at least one downhole condition are disclosed. Pressures are measured at a plurality of locations along the drillstring. The drillstring includes a drillpipe. At least one of the pressures is measured along the drillpipe. At least one downhole condition is detected based, at least in part, on at least one measured pressure.

24 Claims, 30 Drawing Sheets

(56) References Cited

U.S. PATENT DOCUMENTS

| | | | |
|---|---|---|---|
| 4,379,493 | A | 4/1983 | Thibodeaux |
| 4,384,483 | A | 5/1983 | Dellinger et al. |
| 4,535,429 | A | 8/1985 | Russell et al. |
| 4,553,428 | A | 11/1985 | Upchurch |
| 4,697,650 | A | 10/1987 | Fontenot |
| 4,779,852 | A | 10/1988 | Wassell |
| 4,791,797 | A | 12/1988 | Paske et al. |
| 4,805,449 | A | 2/1989 | Das |
| 4,941,951 | A | 7/1990 | Sheppard et al. |
| 5,144,589 | A | 9/1992 | Hardage |
| 5,156,223 | A | 10/1992 | Hipp |
| 5,563,512 | A | 10/1996 | Mumby |
| 5,581,024 | A | 12/1996 | Meyer, Jr. et al. |
| 5,679,894 | A | 10/1997 | Kruger et al. |
| 5,798,488 | A | 8/1998 | Beresford et al. |
| 5,804,713 | A | 9/1998 | Kluth |
| 5,812,068 | A | 9/1998 | Wisler et al. |
| 5,886,303 | A | 3/1999 | Rodney |
| 5,995,020 | A | 11/1999 | Owens et al. |
| 6,026,914 | A | 2/2000 | Adams et al. |
| 6,079,505 | A | 6/2000 | Pignard et al. |
| 6,176,323 | B1 | 1/2001 | Weirich et al. |
| 6,179,066 | B1 | 1/2001 | Nasr et al. |
| 6,206,108 | B1 | 3/2001 | Macdonald et al. |
| 6,220,087 | B1 * | 4/2001 | Hache ............... E21B 47/06 73/152.46 |
| 6,279,392 | B1 | 8/2001 | Shahin, Jr. et al. |
| 6,325,123 | B1 | 12/2001 | Gao et al. |
| 6,405,136 | B1 | 6/2002 | Li et al. |
| 6,427,125 | B1 * | 7/2002 | Gzara ............... E21B 21/08 702/9 |
| 6,464,021 | B1 | 10/2002 | Edwards |
| 6,516,880 | B1 | 2/2003 | Otten et al. |
| 6,516,898 | B1 | 2/2003 | Krueger |
| 6,568,486 | B1 | 5/2003 | George |
| 6,581,455 | B1 | 6/2003 | Berger et al. |
| 6,641,434 | B2 | 11/2003 | Boyle et al. |
| 6,670,880 | B1 | 12/2003 | Hall et al. |
| 6,847,304 | B1 | 1/2005 | McLoughlin |
| 2002/0017386 | A1 | 2/2002 | Ringgenberg et al. |
| 2002/0074165 | A1 | 6/2002 | Lee et al. |
| 2003/0209365 | A1 | 11/2003 | Downton |
| 2005/0024231 | A1 | 2/2005 | Fincher et al. |

FOREIGN PATENT DOCUMENTS

| | | |
|---|---|---|
| WO | 02/06716 A1 | 1/2002 |
| WO | 02/35048 A1 | 5/2002 |
| WO | 03089758 A1 | 10/2003 |

OTHER PUBLICATIONS

International Preliminary Report on Patentability issued in related PCT Application No. PCT/US2005/07082 mailed Nov. 6, 2007, 10 pages.
International Search Report issued in related PCT Application No. PCT/US2005/006584 mailed Dec. 29, 2005, 3 pages.
International Preliminary Report on Patentability issued in related PCT Application No. PCT/US2005/006584 mailed Sep. 5, 2006, 4 pages.
International Search Report issued in related PCT Application No. PCT/US2005/006837 mailed Aug. 26, 2005, 1 page.
International Preliminary Report on Patentability issued in related PCT Application No. PCT/US2005/006837 mailed Sep. 5, 2006, 4 pages.
Office Action issued in related European Patent Application No. 05724179.6 mailed Aug. 23, 2013, 6 pages.
Office Action issued in related European Patent Application No. 05724179.6 mailed Feb. 4, 2013, 6 pages.
Office Action issued in related European Patent Application No. 05724179.6 mailed Jun. 26, 2014, 8 pages.
Examination Report issued in related Great Britain Patent Application No. GB0619566.3 mailed Mar. 2, 2007, 3 pages.
Response to Examination Report issued in related Great Britain Patent Application No. GB0619566.3 mailed Mar. 2, 2007, 9 pages.
Response to Office Action issued in related European Patent Application No. 05724179.6 mailed Aug. 23, 2013, 30 pages.
Response to Office Action issued in related European Patent Application No. 05724179.6 mailed Feb. 4, 2013, 19 pages.
Office Action issued in related Australian Patent Application No. 2005227212 mailed Nov. 4, 2009, 2 pages.
Response to Office Action issued in related Australian Patent Application No. 2005227212 mailed Nov. 4, 2009, 11 pages.
Office Action issued in related Australian Patent Application No. 2005224600 mailed Jun. 30, 2010, 2 pages.
Response to Office Action issued in related Australian Patent Application No. 2005224600 mailed Jun. 30, 2010, 11 pages.
Office Action issued in related Canadian Patent Application No. 2,558,447 mailed Sep. 24, 2008, 2 pages.
Response to Office Action issued in related Canadian Patent Application No. 2,558,447 mailed Sep. 24, 2008, 15 pages.
Falconer, et al. Applications of a Real Time Wellbore Friction Analysis, SPE 18649, 1989, pp. 265-274.
Frank Reiber, et al., On-Line Torque & Drag: A Real-Time Drilling Performance Optimization Tool, SPE 52836, 1999, pp. 1-10.
Paul Pastusek, et al., A Model for Borehole Oscillations, SPE 84448, 2003, pp. 1-16.
Tom Gaynor, et al., Quantifying Tortuosities by Friction Factors in Torque and Drag Model, SPE 77617, 2002, pp. 1-8.
Ho, H-S., An Improved Modeling Program for Computing the Torque and Drag in Directional and Deep Wells, SPE 18047, 1988, pp. 407-418.
Johancsik, C.A., et al., Torque and Drag in Directional WellsPrediction and Measurement, SPE 11380, 1984, pp. 201-208.
Cook, R.L., et al., First Real Time Measurements of Downhole Vibrations, Forces, and Pressures Used to Monitor Directional Drilling Operations, SPE 18651, 1989, pp. 283-290.
G.E. Guillen and W.G. Lesso Jr., The Use of Weight on Bit, Torque, and Temperature to Enhance Drilling Efficiency, SPE 12165, 1983, pp. 1-12.
Heisig, G., et al., Downhole Diagnosis of Drilling Dynamics Data Provides New Level Drilling Process Control to Driller, SPE 49206, 1998, pp. 649-658.
Wolf, S.F., et al., Field Measurements of Downhole Drillstring Vibrations, SPE 14330, 1985, pp. 1-12.
J.T. Finger, et al., Development of a System for Diagnostic-While-Drilling (DWD), SPE 79884, 2003, pp. 1-9.
A.J. Mansure, et al., Interpretation of Diagnostics-While-Drilling Data, SPE 84244, 2003, pp. 1-13.
A. Leseultre, et al., An Instrumented Bit: A Necessary Step to the Intelligent BHA, SPE 39341, pp. 457-463.
E Alan Coats, Marty Paulk, Chris Dalton, "Wired Composite Tubing Reduces Drilling Risk," Drilling Contractor, pp. 22-23, Jul./Aug. 2002.
"IntelliPipe.TM. Technology: Wired for Speed and Durability," U.S. Department of Energy Office of Fossil Energy http://fossil.energy.gov/news/techlines/03/tl.sub.--intellipipe.sub.--rmo--tctest.html, Jun. 5, 2003.
Michael J. Jellison and David R. Hall, "Intelligent Drill Pipe Creates the Drilling Network," SPE International, SPE 80454, pp. 1-8, Presented at the SPE Asia Pacific Oil and Gas Conference and Exhibition, Jakarta, Indonesia, Apr. 15-17, 2003.
A. Judzis, T. S. Green, G. M. Hoversten, and A. D. Black, "Seismic While Drilling for Enhanced Look-Ahead-Of-Bit Capabilities—Case Study of Successful Mud Pulse Coupling Demonstration," Society of Professional Engineers, SPE 63194, pp. 1-4, Presented at the 2000 SPE Annual Technical Conference and Exhibition Held in Dallas, Texas, Oct. 1-4, 2000.
Daniel C. Minette, Eric Molz, "Utilizing Acoustic Standoff Measurements to Improve the Accuracy of Density and Neutron Measurements," Society of Petroleum Engineers Inc., SPE 56447, pp. 1-14, Presented at the 1999 SPE Annual Technical Conference and Exhibition Held in Houston, Texas, Oct. 3-6, 1999.
"Telemetry Drill Pipe: Enabling Technology for the Downhole Internet," http://www.intellipipe.com/brochures.asp, Intellipipe Brochure 1.

(56) References Cited

OTHER PUBLICATIONS

"Telemetry Drill Pipe: Enabling Technology for the Downhole Internet," http://www.intellipipe.com/brochures.asp, Intellipipe Brochure 2.
Chris Ward and Espen Andreassen, "Pressure-While-Drilling Data Improve Reservoir Drilling Performance," SPE Drilling & Completion, Mar. 1998, pp. 19-24.
C.A. Johancsik, et al., Torque and Drag in Directional Wells—Prediction and Measurement, Journal of Petroleum Technology, pp. 987-992 (Jun. 1984).
U.S. Appl. No. 60/491,567, filed Jul. 31, 2003, Roger Fincher.
U.S. Appl. No. 60/478,237, filed Jun. 13, 2003, Roger Fincher.
U.S. Appl. No. 10/793,350, filed Mar. 4, 2004, Rodney, et al.
U.S. Appl. No. 10/792,541, filed Mar. 3, 2004, Rodney, et al.
U.S. Appl. No. 10/793,537, filed Mar. 4, 2004, Dudley, et al.
U.S. Appl. No. 10/793,062, filed Mar. 4, 2005, Gleitman, et al.
U.S. Appl. No. 11/051,762, filed Feb. 4, 2005, Daniel Gleitman.
U.S. Appl. No. 11/070,625, filed Mar. 2, 2005, Daniel Gleitman.
Official Action issued in related Norwegian Patent Application No. 20150463 mailed Jan. 27, 2016, 3 pages.
Search Report issued in related Norwegian Patent Application No. 20150463 mailed Jan. 27, 2016, 2 pages.

* cited by examiner

US 9,441,477 B2

1

MULTIPLE DISTRIBUTED PRESSURE MEASUREMENTS

CROSS-REFERENCE TO RELATED APPLICATIONS

This application is a continuation of U.S. patent application Ser. No. 11/051,762, filed Feb. 4, 2005, entitled "Multiple Distributed Pressure Measurements," by Daniel Gleitman, which, in turn, claims priority to commonly owned U.S. provisional patent application Ser. No. 60/550,033, filed Mar. 4, 2004, entitled "Multiple Distributed Sensors Along A Drillpipe," by Daniel Gleitman.

BACKGROUND

As oil well drilling becomes increasingly complex, the importance of collecting downhole data while drilling increases.

2

Figure 33:
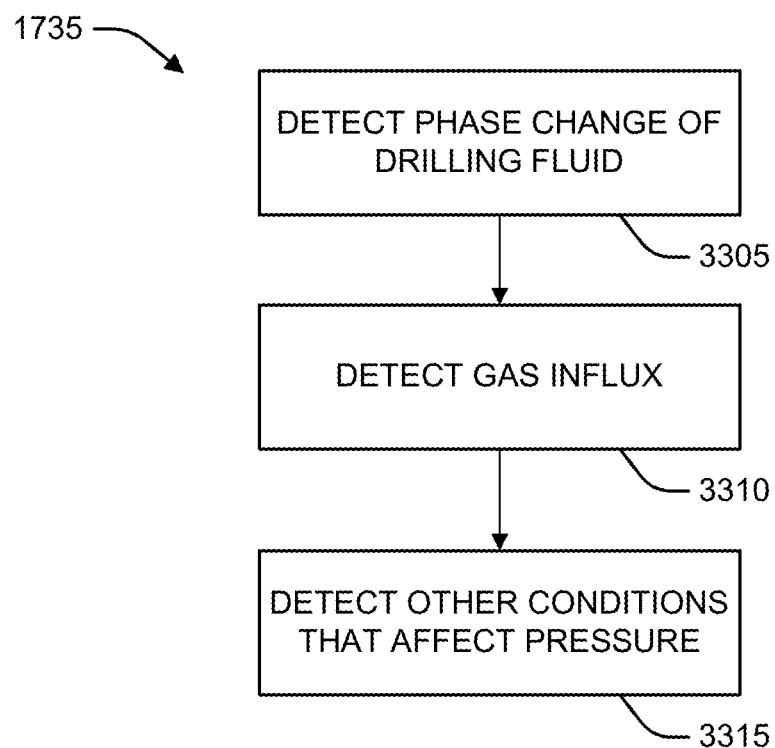

FIG. 33 show a block diagram of a system for identifying and locating additional downhole conditions.

Figure 34:
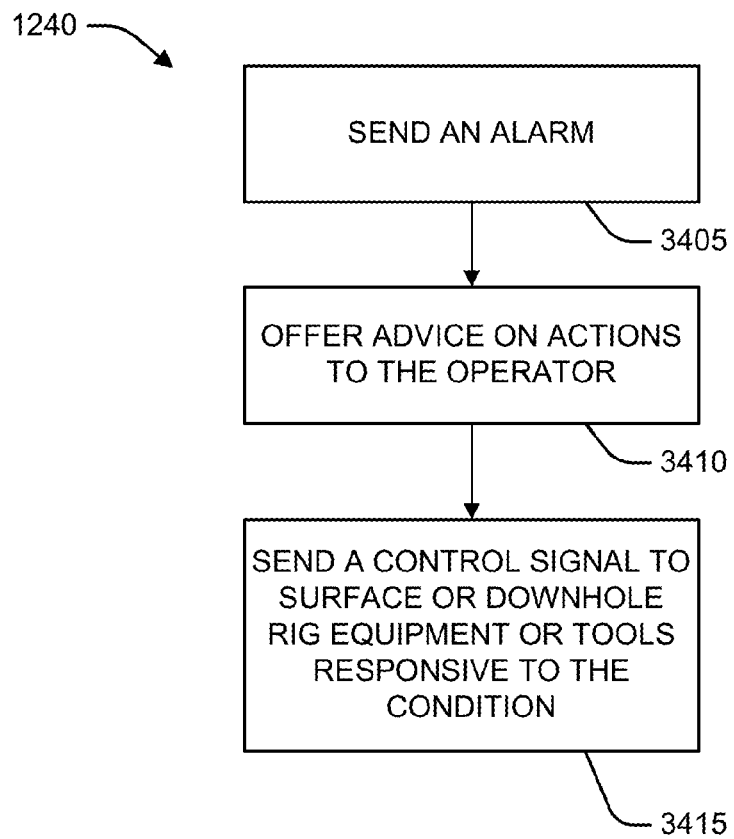
Figure 35:
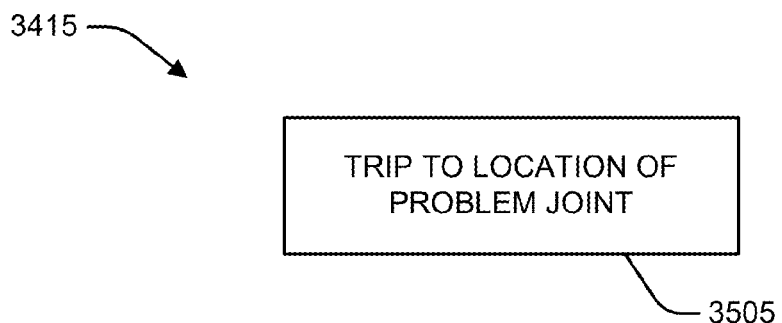

FIGS. 34-35 show block diagrams of systems for additional action based on detected conditions.

Figure 36:
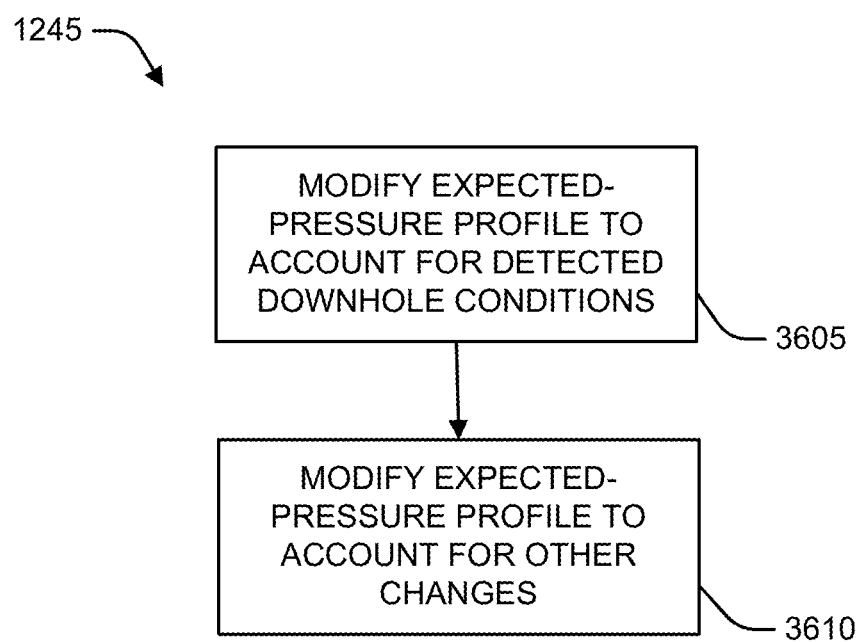

FIG. 36 shows a block diagram of a system for modifying an expected value set.

DETAILED DESCRIPTION

Figure 1:
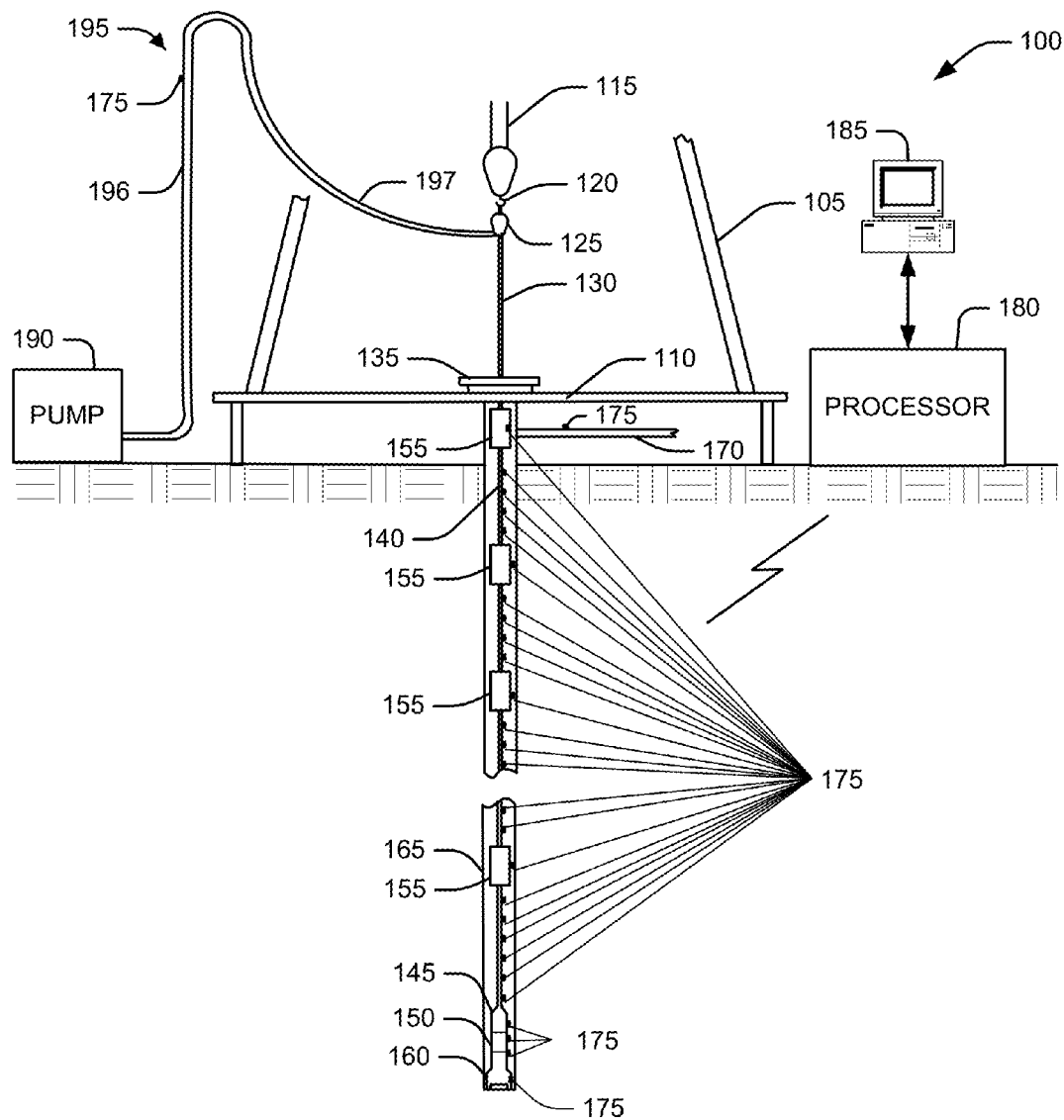
FIG. 1 shows a system for processing downhole data.

As shown in FIG. 1, oil well drilling equipment 100 (simplified for ease of understanding) includes a derrick 105, derrick floor 110, draw works 115 (schematically represented by the drilling line and the traveling block), hook 120, swivel 125, kelly joint 130, rotary table 135, drillpipe 140, one or more drill collars 145, one or more MWD/LWD tools 150, one or more subs 155, and drill bit 160. Drilling fluid is injected by a mud pump 190 into the swivel 125 by a drilling fluid supply line 195, which may include a standpipe 196 and kelly hose 197. The drilling fluid travels through the kelly joint 130, drillpipe 140, drill collars 145, and subs 155, and exits through jets or nozzles in the drill bit 160. The drilling fluid then flows up the annulus between the drillpipe 140 and the wall of the borehole 165. One or more portions of borehole 165 may comprise open hole and one or more portions of borehole 165 may be cased. The drillpipe 140 may be comprised of multiple drillpipe joints and may optionally include one or more subs 155 distributed among the drillpipe joints. If one or more subs 155 are included, one or more of the subs 155 may include sensing equipment (e.g., sensors), communications equipment, data-processing equipment, or other equipment. The drillpipe joints may be of any suitable dimensions (e.g., 30 foot length). A drilling fluid return line 170 returns drilling fluid from the borehole 165 and circulates it to a drilling fluid pit (not shown) and then the drilling fluid is ultimately recirculated via the mud pump 190 back to the drilling fluid supply line 195. The combination of the drill collar 145, MWD/LWD tools 150, and drill bit 160 is known as a bottomhole assembly (or "BHA"). The combination of the BHA, the drillpipe 140, and any included subs 155, is known as the drillstring. In rotary drilling the rotary table 135 may rotate the drillstring, or alternatively the drillstring may be rotated via a top drive assembly.

The terms "couple" or "couples," as used herein are intended to mean either an indirect or direct connection. Thus, if a first device couples to a second device, that connection may be through a direct connection, or through an indirect electrical connection via other devices and connections. The term "upstream" as used herein means along a flow path towards the source of the flow, and the term "downstream" as used herein means along a flow path away from the source of the flow.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

One or more pressure sensors 175 may be distributed along the drillpipe, with the distribution depending on the needs of the system. One or more such pressure sensors 175 may be used to measure pressure along the drillpipe. In an example implementation, one or more pressure sensors 175 are located on or within the drillpipe 140. Other pressure sensors 175 may be on or within the drill collar 145 or the one or more MWD/LWD tools 150. Still other pressure sensors 175 may be in built into, or otherwise coupled to, the bit 160. Still other pressure sensor 175 may be disposed on or within one or more subs 155.

Other pressure sensors 175 may be located at or near the surface to measure, for example, one or more of drilling fluid supply line (e.g. standpipe) or return line pressures. In many cases a pressure sensor 175 located on or along the standpipe 196 (or other drilling fluid supply line location) may be used to provide drillstring interior pressure measurements at or near the top of the drillstring or borehole. In certain example implementations, the drillstring interior pressure may be determined inferentially based on pressure measurements, using, for example, pressure measurements taken from the drilling fluid supply line. In some example implementations, a pressure sensor 175 located on or along a return line may be used to provide drillstring exterior or annulus pressure measurements at or near the top of the drillstring or borehole. In some example systems, drillstring exterior or annulus pressure measurements at or near the top of the drillstring or borehole may be determined inferentially, using, for example, pressure measurements taken on a return line. In some example systems, drillstring exterior pressure at the top of the drillstring or borehole may be determined inferentially based on atmospheric pressure. Still other pressure sensors 175 may be affixed to one or more locations along the borehole 165. Other pressure sensors 175 may be circulated in the drilling fluid.

In certain implementations, one or more pressure sensors 175 may be ported (e.g., hydraulically ported) to the outside of one or more portions of the drillstring, such as the drillpipe 140, the drill collar 145, the MWD/LWD tools 150, the subs 155, or the bit 160. The pressure sensors 175 ported to the outside of the drillstring may measure one or more pressures in an annulus defined by the drillstring and the borehole 165. In certain example implementations, one or more pressure sensors 175 may be ported to the interior of the drillstring and may measure the pressure within the drillstring. In certain implementations, one or more pressure sensors 175 may be ported to the exterior of the drillstring to measure one or more pressures in the annulus and one or more other pressure sensors 175 may be ported to the interior of the drillstring to measure one or more pressures within the drillstring. Pressure sensors 175 may be ported to the interior or exterior of drillstring elements to obtain static pressure measurements.

In certain implementations, one or more pressure sensors 175 may be ported to drillstring components that are used for drilling and that are subsequently left in the borehole 165. These drillstring components may be used in casing-while-drilling (i.e. drilling with casing) operations. The drillstring components may be included in a completed well. In such an implementations, one or more pressure sensors may measure and report pressure after drilling operations are complete.

The pressure sensors 175 convert pressures to one or more signals. One or more pressure sensors 175 may include strain gauge type devices, quartz crystal devices, fiber optical devices, or other devices used in sensing pressure. The one or more signals from the pressure sensors 175 may be analog or digital. In certain implementations, one or more pressure sensors 175 may be oriented to measure one or more static pressures. For example, one or more pressure sensors 175 may be oriented perpendicular to streamlines of the drilling fluid flow. One or more pressure sensors 175 may measure stagnation pressure by orienting the pressure sensors 175 to face, or partially face, into the drilling fluid flow. In certain implementations, one or more pressure sensors 175 may use an extended pitot tube approach or a shallow ramping port to orient the sensors 175 to face, or partially face, into the drilling fluid flow. The measurement accuracy of the stagnation pressure may vary depending on a degree of boundary layer influence.

Figure 2:
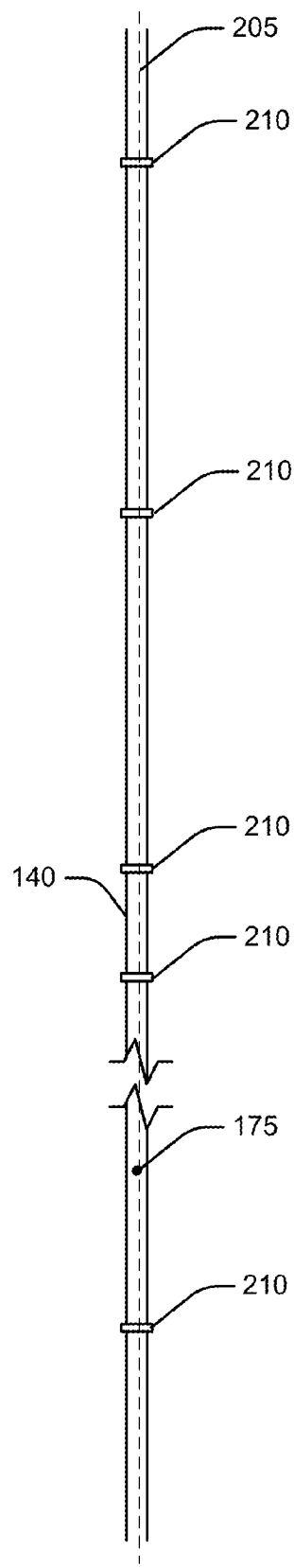
FIG. 2 illustrates a portion of drillpipe with an affixed sensor and a communications medium.

A portion of drillpipe 140 is schematically illustrated in FIG. 2. The illustrated portion of drillpipe includes interfaces 210 between the joints that form drillpipe 140. Interfaces 210 may include threaded mechanical connections which may have different inner and outer diameters as compared to the balance of the drillpipe. One or more of the interfaces 210 may include communication interfaces. Signals from pressure sensors 175 are coupled to communications medium 205, which may be disposed in the drillpipe 140 or external to the drillpipe 140. Drillpipe, such as drillpipe 140, with communications medium 205, may collectively be referred to as a wired drillpipe.

In one example system, the communications medium 205 may be located within an inner annulus of the drillpipe 140. The communications medium 205 may comprise one or more concentric layers of a conductor and an insulator disposed within the drillstring. In another example system, the drillpipe 140 may have a gun-drilled channel though at least portions of its length. In such a drillpipe 140, the communications medium 205 may be placed in the gun-drilled channel. In another example system, the communications medium 205 may be fully or partly located within a protective housing, such as a capillary tubing that runs at least a portion of the length of the drillpipe 140. The protective housing may be attached or biased to the drillpipe inner diameter or stabilized within the drillpipe bore.

The communications medium 205 may be a wire, a cable, a fluid, a fiber, or any other medium. In certain implementations, the communications medium may permit high data transfer rates. The communications medium 205 may include one or more communications paths. For example, one communications path may connect to one or more pressure sensors 175, while another communications path may connect another one or more sensor sensors 175. The communications medium 205 may extend from the drillpipe 140 to the subs 155, drill collar 145, MWD/LWD tools 150, and the bit 160. The communications medium 205 may include physical connectors or mating conductors to complete a transition in the communications medium 205 across drillpipe joints and other connections.

The communications medium 205 may transition from one type to another along the drillstring. For example, one or more portions of the communications medium 205 may include an LWD system communications bus. One more or portions of the communications medium 205 may comprise a "short-hop" electromagnetic link or an acoustical telemetry link. The "short-hop" electromagnetic links or acoustical telemetry link may be used to interface between drillpipe joints or across difficult-to-wire drillstring components such as mud motors.

A processor 180 may be used to collect and analyze data from one or more pressure sensors 175 This processor 180 may process the pressure data and provide an output that is a function of the processed or unprocessed pressure data. This output may then be used in the drilling process. The processor may include one or more processing units that operate together (e.g., symmetrically or in parallel) or one or more processing units that operate separately. The processing units may be in the same location or in distributed locations. The processor 180 may alternatively be located below the surface, for example, within the drillstring. The processor 180 may operate at a speed that is sufficient to be useful in the drilling process. The processor 180 may include or interface with a terminal 185. The terminal 185 may allow an operator to interact with the processor 180.

The communications medium 205 may transition to connect the drillstring to the processor 180. The transition may include a mechanical contact which may include a rotary brush electrical connection. The transition may include a non-contact link which may include an inductive couple or a short-hop electromagnetic link.

The pressure sensors 175 may communicate with the processor 180 through the communications medium 205. Communications over the communications medium 205 can be in the form of network communications, using, for example, Ethernet. Each of the pressure sensors 175 may be addressable individually or in one or more groups. Alternatively, communications can be point-to-point. Whatever form it takes, the communications medium 205 may provide high-speed data communication between the sensors in the borehole 165 and the processor 180. The speed and bandwidth characteristics of the communications medium 205 may allow the processor 180 to perform collection and analysis of data from the pressure sensors 175 fast enough for use in the drilling process. This data collection and analysis may be referred to as "real-time" processing. Therefore, as used herein, the term "real-time" means a speed that is useful in the drilling process.

Figure 3:
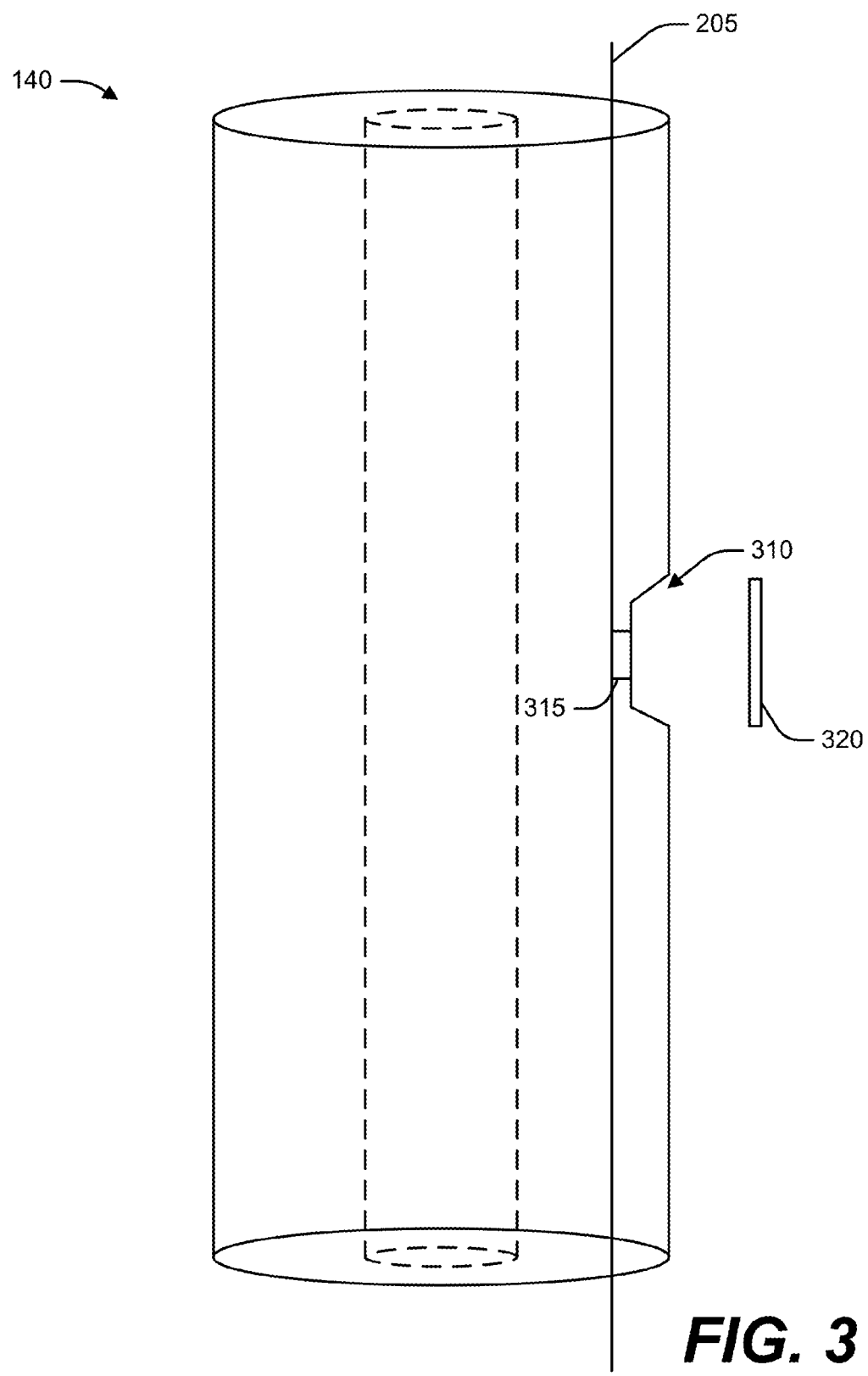
FIG. 3 illustrates a portion of drillpipe with a sensor-module receptacle.

A portion of drillpipe 140, including a sensor-module receptacle 310 is illustrated in FIG. 3. The sensor-module receptacle 310 is defined by a recess in the exterior of the drillpipe 140. The recess may be in the exterior of an upset drillpipe joint. The sensor-module receptacle 310 may be any suitable size or shape to engage and retain a pressure sensor 175. The sensor-module receptacle 310 may also include threads to retain the pressure sensor 175 within sensor-module receptacle 310. The drillpipe 140 may also include one or more drillpipe couplers, such as drillpipe coupler 315, to couple the signal from the sensor in pressure sensor 175 to the communications medium 205. When the sensor-module receptacle 310 is empty, a sensor-module-receptacle cover 320 may be used to cover the sensor-module receptacle 310. An example sensor-module-receptacle cover 320 may have an exterior for plugging into the sensor-module receptacle 310. Another example pressure sensor-receptacle cover 320, for use with a sensor-module receptacle 310 that is threaded, is shaped such to engage the threading when place on sensor-module receptacle 310.

Figure 4:
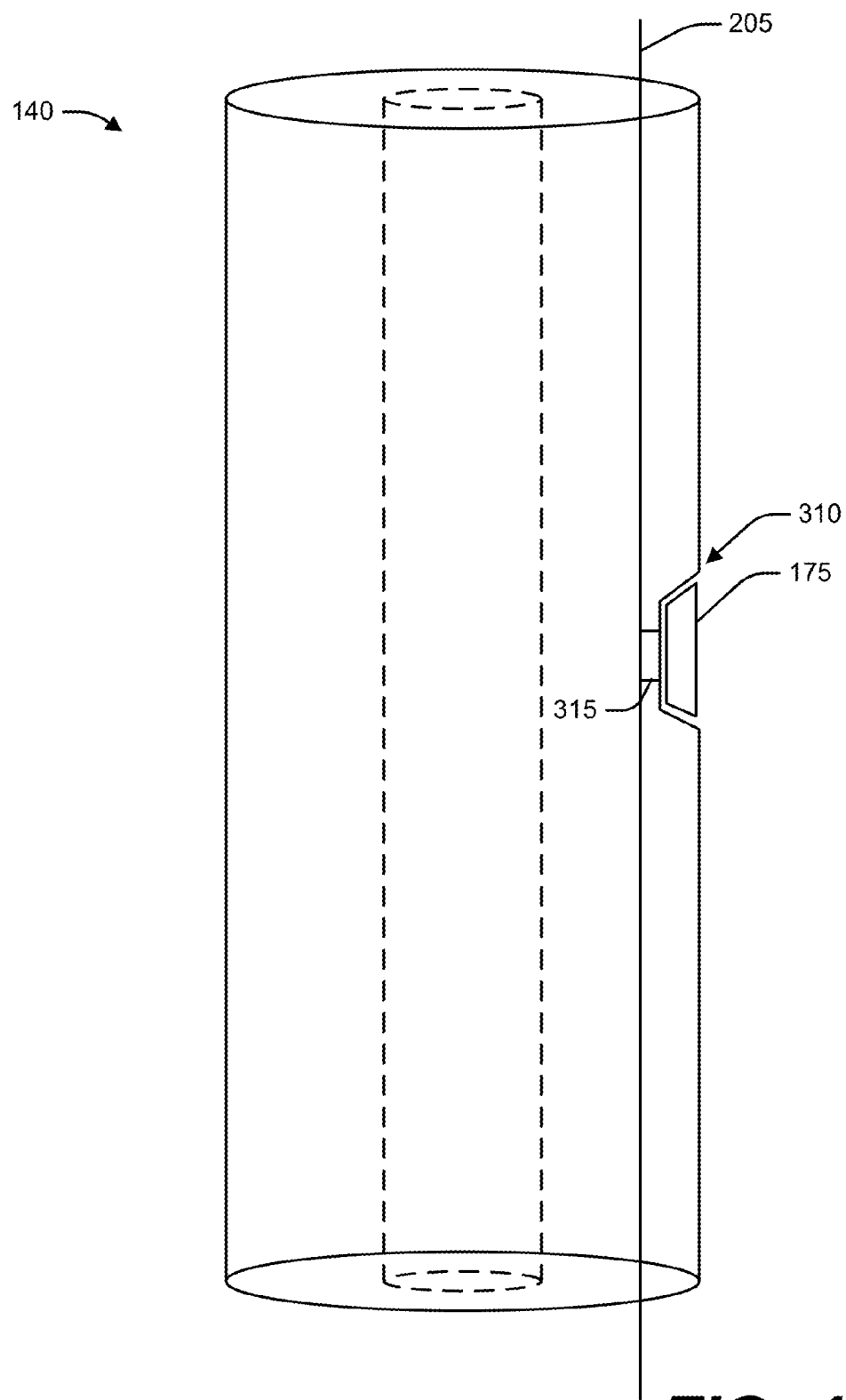
FIG. 4 illustrates a portion of drillpipe with a pressure sensor in a sensor-module receptacle.

A portion of drillpipe 140, including a pressure sensor 175 in sensor-module receptacle 310 is illustrated in FIG. 4. The pressure sensor 175 may be any suitable size and shape to plug into the sensor-module receptacle 310. If the sensor-module receptacle 310 includes threading, the exterior pressure sensor 175 may have complementary features, such as threading, to engage the sensor-module receptacle 310 threading. The pressure sensor 175 may have a protective exterior to isolate it from the ambient conditions exterior to the drillpipe 140 which may include the mud flowing around drillpipe 140. The pressure sensor 175 may be easily inserted and removed from sensor-module receptacle 310 to permit swapping or replacement of pressure sensors 175, based on the type of data to be collected in the portion of the drillpipe 140 where the pressure sensor 175 will be located, or for maintenance.

Figure 5:
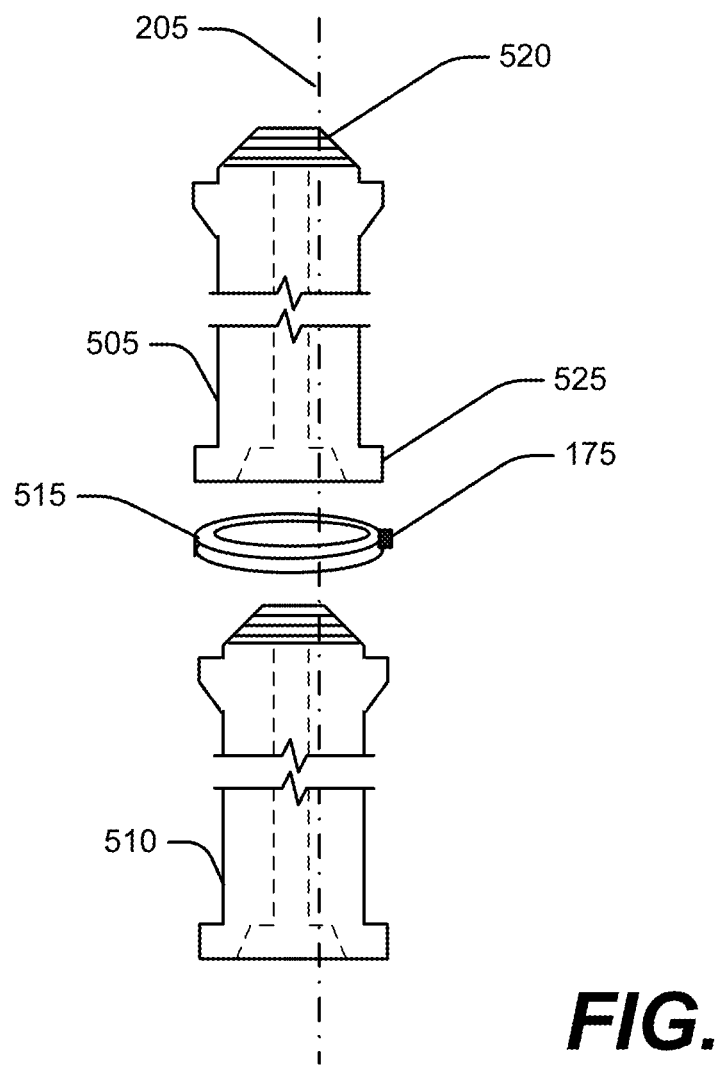
FIG. 5 illustrates drillpipe joints and a gasket.

In addition to sensor-module receptacles 310, pressure sensors 175 may also be mounted on gaskets between joints of drillpipe. Two joints of drillpipe 505 and 510 with a gasket 515 are schematically illustrated in FIG. 5. Each of the joints of drillpipe 505 and 510 have a pin end 520 and a box end 525. Both the pin and box ends may include threading and load shoulders to allow forming the drillpipe 140 from the joints. A gasket 515 may be placed between the load shoulder of box end 520 of drillpipe joint 505 and the load shoulder of pin end 515 of drillpipe joint 510. When the two joints 505 and 510 are joined together, the gasket is located at the interface between the joints. A pressure sensor 175 may be incorporated within gasket 515 or may be mounted to the exterior of gasket 515. The output of the sensor in the pressure sensor 175 may be coupled to the communications medium 205 using one or more of the methods described below with respect to FIG. 10. This arrangement allows the mounting of pressure sensors on drillpipe without sensor receptacles in the drillpipe 140. The gasket-mounted pressure sensors may be used alone, or in conjunction with pressure sensors mounted as described with respect to FIGS. 2 and 3. In another embodiment, a pressure sensor receptacle 310 may be created in the exterior of the gasket 515.

Figure 6:
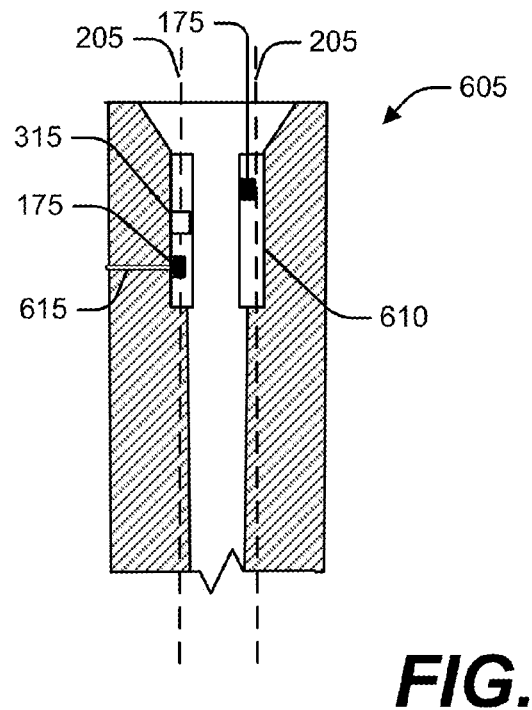
FIG. 6 is a cut-away diagram of the pin-end of a drillpipe joint with pressure sensors affixed to the joint.

In addition to sensor-module receptacles 310 and gaskets 515, pressure sensors 175 may also be mounted in the ends of drillpipe joints. A cross-sectional diagram of the box end 605 of a drillpipe joint is shown in FIG. 6. The joint of drillpipe includes a box end 605 adapted to retain a box-end insert 610. The box end 605 may include an elongated upset portion. The interior of the box end 605 of the joint may be bored back (beyond the threads) to allow the box-end insert 610 to be placed in the bored-back area. The box-end insert 610 may include one or more pressure sensors 175. The pressure sensors 175 may be ported to measure one or more of bore pressure or annular pressure exterior to the drillpipe joint. For example, one or more pressures sensors 175 mounted in the box-end insert 610 may be coupled with a conduit 615 to the exterior of the drillpipe joint. The conduit 615 may include one or more drilled holes, one or more capillary tubes, one or more seals, or other means to port the annular pressure to a pressure sensor disposed within the drillpipe joint. In general, one or more pressure sensors 175 may be ported to measure bore or internal pressure. The box-end insert 610 may include one or more communication couplers, such as drillpipe coupler 315. The box-end insert 610 may include other communication or processing equipment.

Figure 7:
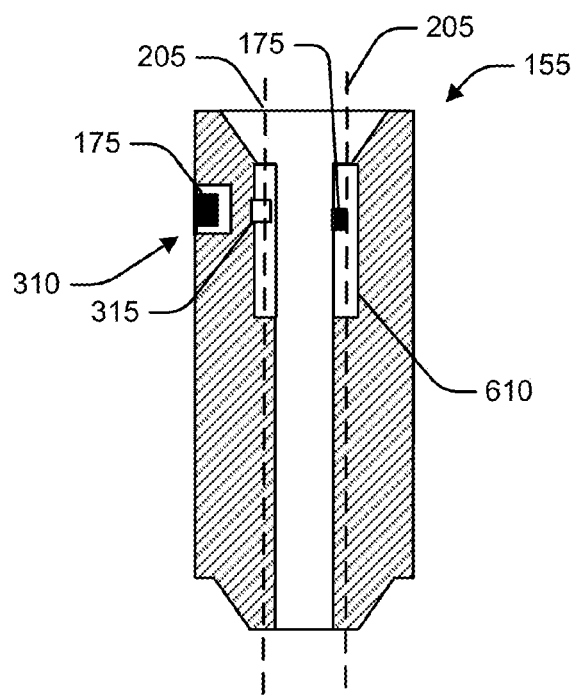
FIG. 7 is a cut-away diagram of a node sub with a pressure sensor.

A cross-sectional diagram of an example sub 155 is shown in FIG. 7. The sub 155 shown in FIG. 7 may include threading to attach between two drillpipe joints. One or more portions of the sub 155 may be cut away to form pressure sensor receptacles 310 to contain pressure sensors 175. The sub 155 may include a coupler 315 to couple the pressure sensor 175 to the communications medium 205. The box-end of the sub 155 may be bored back to retain a box-end insert 610. The box-end insert 610 may include one or more pressure sensors 175 ported to measure annular pressure. The box-end insert 610 may include one or more pressure sensors 175 ported to measure bore pressure. The box-end insert may include one or more communications couplers, such as drillpipe coupler 315. The communications medium may be disposed in the sub 155. As discussed above, the sub 155 may include communication equipment.

Figure 8:
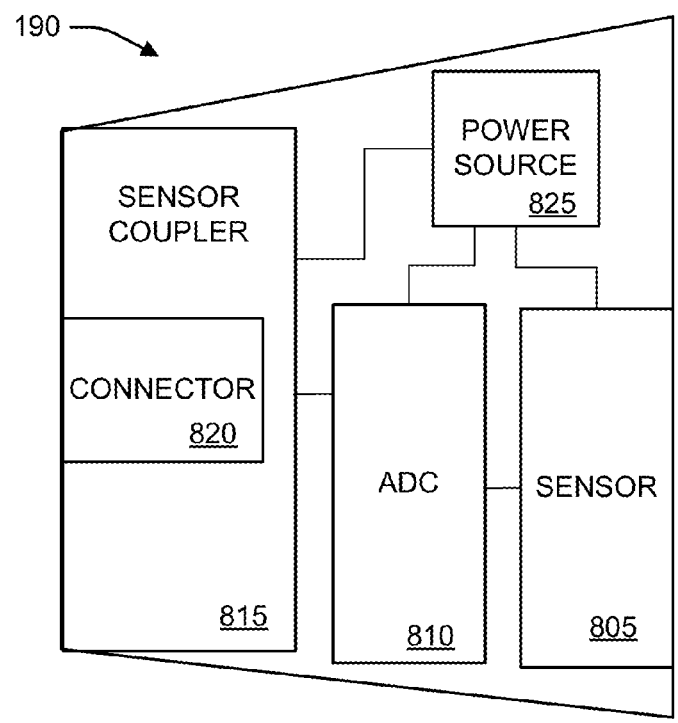
FIG. 8 shows a block diagram for a pressure sensor.

An example pressure sensor 175, shown schematically in FIG. 8, includes a sensor device 805 to produce a signal indicative of the pressure it experiences. The sensor device 805 may be positioned within the pressure sensor 175 so that the sensor device 805 is ported or protrudes from the pressure sensor 175, allowing the sensor device 805 to directly measure a fluid pressure external to the pressure sensor 175. In each of the pressure sensor types discussed, suitable porting via drilled holes, capillary tubes, seals, or other means may be employed to port the fluid at the desired pressure measurement location (e.g. within or external to drillstring), into the pressure sensor.

Figure 9:
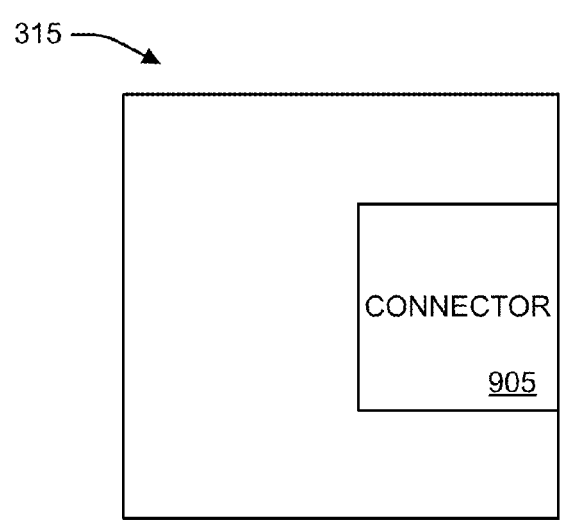
FIG. 9 shows a block diagram of a drillpipe coupler.

The output from the sensor device 805 may be digital or analog. Depending on the mode of communications used over the communications medium 205, the output from the sensor may require conversion from analog to digital with an analog-to-digital converter 810. The pressure sensor 175 may also include a plurality of analog-to-digital converters 810 to accommodate multiple sensors 805. After the sensor device 805 has produced a signal indicative of the measured property, the signal will be coupled to the communication medium 205 using a communications coupler, which may include a sensor coupler 815 within the pressure sensor 175 and may include a drillpipe coupler 315 (shown in FIG. 3). The sensor coupler may include a connector 820 for inducing a signal in the drillpipe coupler 315, shown in FIG. 9. The drillpipe coupler may include a connector 905 for engaging the sensor coupler connector 820. Connectors may include direct electrical connection and example suitable connectors of this type include those from Kemlon and Greene Tweed, both of Houston, Tex.

The communication coupler, which is the combination of the sensor coupler 815 and the drillpipe coupler 315, performs signal transformations necessary to couple the sensor signal to the communications medium 205. One example communication coupler may re-encode the signal from the sensor device 805 or the analog-to-digital converter, include header information, and transmit the signal over the communication medium 205.

Figure 10:
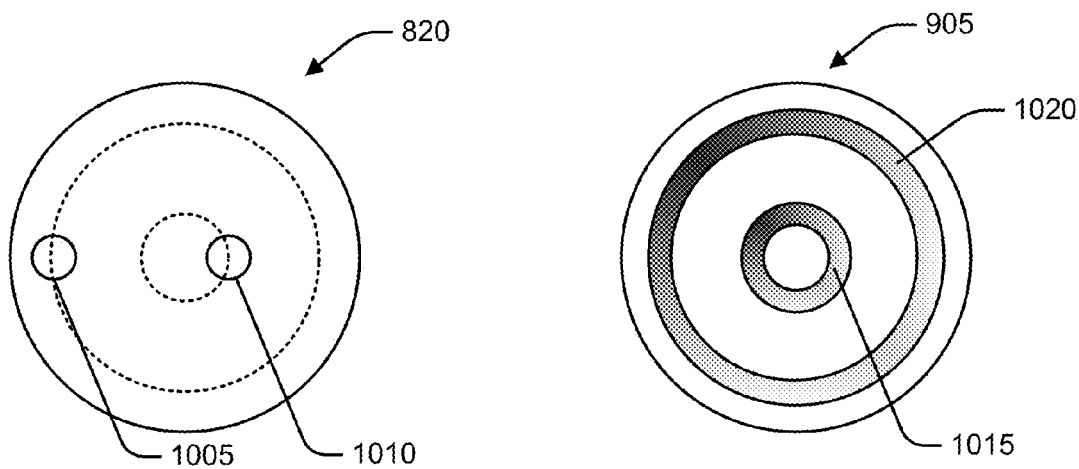
FIGS. 10 and 11 illustrate connectors for sensor couplers and drillpipe couplers.

An example complementary pair of sensor-coupler and drillpipe-coupler connectors 820 and 905 is shown schematically in section view in FIG. 10. The drillpipe-coupler connector 820 includes two conductive plugs 1005 and 1010, which will protrude from the drillpipe 140 at the base of the sensor-module receptacle 310. The complementary sensor-coupler connector 905 includes two conductive rings 1015 and 1020. This arrangement allows the connectors 820 and 905 to mate when, for example, the pressure sensor 175 is screwed into the sensor-module receptacle 310. In such a configuration, the drillpipe coupler 315 and the sensor coupler 810 have a direct electrical connection and the drillpipe coupler may be in direct electrical contact with the communications medium 205.

Figure 11:
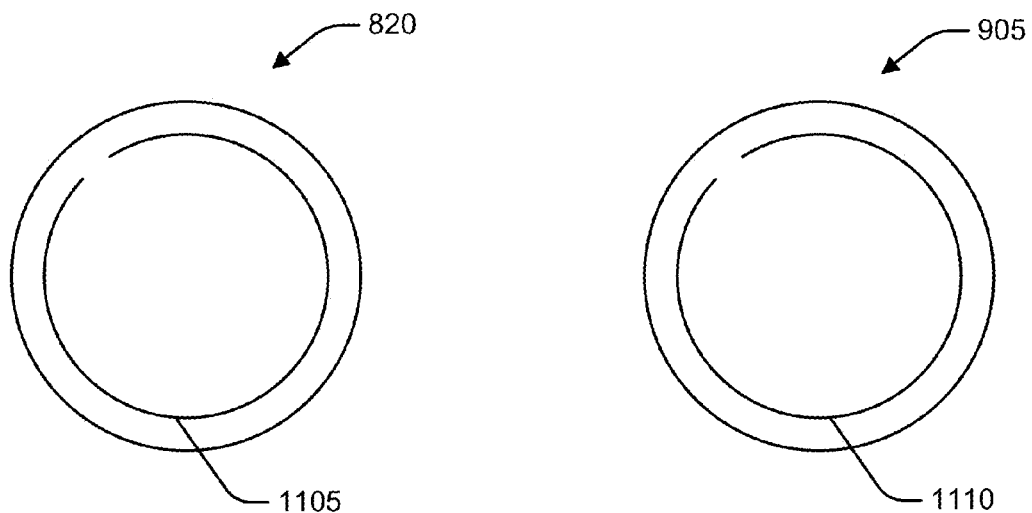

Another example complementary pair of sensor-coupler and drillpipe-coupler connectors 820 and 905 is shown in FIG. 11. The sensor-coupler connector 820 includes an antenna 1105 and the drillpipe-coupler connector includes an antenna 1110. In such a configuration, the sensor coupler transmits the signal indicative of the one or more measured properties to the drillpipe coupler using wireless signaling. For example, the sensor and drillpipe coupler may communicate using short-hop telemetry or another wireless communication method. Each of the antennas 1105 and 1110 may be any antenna or other transducer capable of providing communication between the sensor coupler 810 and the drillpipe coupler 315.

In another example system, the sensor-coupler connector 820 and the drillpipe-coupler connector 905 may include inductors or coils. The sensor coupler 815 may pass current though its inductor to create an electromagnetic field indicative of the sensor signal. The electromagnetic field, in turn, induces a current in the drillpipe coupler's inductor. In another example system, the connectors 820 and 905 may form two plates of a capacitor allowing a signal to be capacitively induced on the opposing plate. The pressure sensor 175 or the base of the sensor-module receptacle 310 may include a coating or insert to provide a dielectric between the connectors 820 and 905 for capacitive coupling.

Returning to FIG. 8, the components in pressure sensor 175 may require power to operate. In one example system, the necessary power may be provided by power source 825, which may be a battery, such as a lithium battery. In another example system, the necessary power may be supplied over the communication medium 205 using, for example, Power Over Ethernet (POE). In yet another example system, a separate power line may be run though the drillpipe 205 and taps may be provided for the attached pressure sensors 175. One or more pressure sensors 175 may be powered from a central bus with power provided from the surface, or from a downhole central battery module. The power may be generated by, for example, a downhole generator driven by the mud flow or drillpipe rotation, or another power source.

Figure 12:
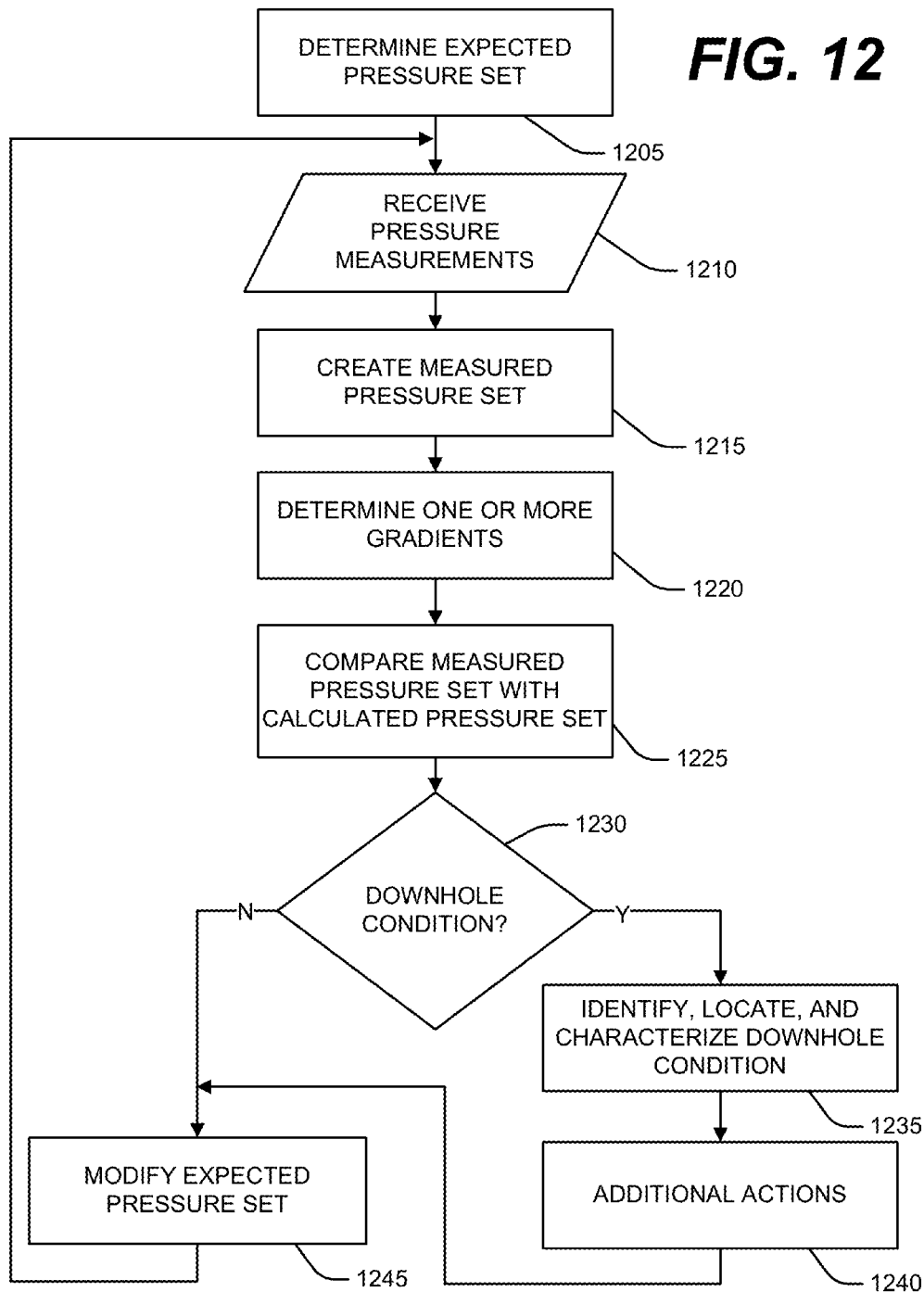
FIG. 12 shows a block diagram of a system for detecting at least one downhole condition.

An example system for detecting downhole conditions based on one or more pressure measurements from one or more pressure sensors 175 is shown in FIG. 12. The processor 180 determines a set of expected pressure values (block 1205). The processor 180 receives one or more pressure measurements from the pressure sensors 175 (block 1210). The processor 180 may create a measured-pressure set from the pressure measurements received and may determine one or more measured-pressure gradients (blocks 1215 and 1220). The processor 180 may compare the measured pressure profile with the expected pressure profile (block 1225) to detect a downhole condition. If the processor detects a downhole condition (block 1230, which is shown in greater detail in FIG. 16), it may identify, locate, and characterize the downhole condition (block 1235, which is shown in greater detail in FIG. 17). The processor 180 may perform further actions (block 1240). Regardless of whether the processor 180 detects a downhole condition (block 1230), it may modify the expected-pressure set (block 1245) and may return to block 1210.

Creating the set of expected pressure values (block 1205) may include receiving one or more expected pressures from an external source (e.g., a user, a database, or another processor). Creating the expected-pressure set may include accessing simulation results such as modeling results. The modeling to create the expected pressure values may include hydraulics modeling. The hydraulics modeling may consider one or more of the following: properties of the borehole and drillstring, fluid properties, previous pressure measurements from the borehole or another borehole, or other measurements. In some implementations an expected-pressure set may be created by copying one or more values from a measured-pressure set. In other implementations an expected-pressure set may be created by using values from a measured-pressure set and adjusting or operating upon the values in accordance with an algorithm or model. Some implementations utilizing measured-pressure sets in the creation of expected-pressure sets may use measured-pressure sets from a recent time window, an earlier time window, or multiple time windows. Certain example expected-pressure sets may be derived from trend analysis of measured-pressure sets, such trends being observed or calculated in reference to for example elapsed time, circulation time, drilling time, depth, another variable, or combinations of variables.

The set of expected pressure values may include one or more pressure values at one or more depths in the borehole 165. The depths may be locations of interest within the borehole 165. A set of expected values may be provided or determined corresponding to all or a portion of the fluid flow path within the borehole 165. The set of expected pressure values may represent one or more pressure profiles. A pressure profile may include a set of two or more pressures, and a set of two or more depths, or ranges of depths, where each pressure corresponds to a depth or a range of depths. The pressure profiles may exist, may be measurable, and may be modelable along the continuum of fluid or fluids in the borehole 165 along one or more fluid flow paths within the borehole 165 and along one or more drillstring/borehole 165 hydraulic paths or circuits.

Example pressure profiles may include one or more hydrostatic profiles. Other example pressure profiles include one or more static pressure profiles that may include losses. The losses may include frictional losses or major losses. Other example pressure profiles may include stagnation pressure profiles. The stagnation pressure profiles may be related to flow velocity. Example pressure profiles may include arithmetic or other combinations or superposition of profiles.

While drilling the borehole 165, the processor 180 may change the expected-pressure set to reflect changes in the well. The processor 180 may change the expected-pressure set to reflect drilling progress (e.g. increasing depth). The processor 180 may alter the expected-pressure set to account for one or more known or unknown drilling process events or conditions. Changes to the pressure profile may be consistent or inconsistent with modeling, forecasts, or experience.

The processor 180 may model or be provided hydrostatic pressures, hydrostatic profiles, and changes in hydrostatic pressure within the drillstring or the borehole 165. The processor 180 may model or be provided frictional pressures, frictional profiles, frictional losses, or frictional changes within the drillstring or the borehole 165. The processor 180 may model or be provided with one or more stagnation pressures, stagnation pressure profiles, stagnation pressure losses, or stagnation pressure changes within the drillstring or the borehole 165. The processor 180 may consider one or more factors impacting pressure including the dimensions of the drillstring (e.g., inner and outer diameters of joints or other portions of the drillpipe and other drillstring elements) and dimensions of the borehole 165. The processor 180 may also consider one or more depths corresponding to one or more measured pressures within the borehole 165. The processor 180 may consider drilling fluid properties (e.g., flow rates, densities), one or more major loss sources (e.g., drill bit nozzles or mud motors), and whether one or more portions of the borehole 165 are cased or open hole.

The processor 180 may be provided with or calculate one or more depths when calculating the expected-pressure set. The depths may include one or more of the following: the true-vertical depth (TVD) (i.e., only the vertical component of the depth), measured depth (MD) (i.e., the direction-less distance from the start of the borehole or other reference point chosen such as ground level, sea level, or rig level, to the bottom of the borehole or other point of interest along the borehole), and the round-trip depth (RTD). In general, the RTD is the direction-less distance traveled by the drilling fluid. The RTD may be measured from the mud pumps or the start of borehole 165 (or another starting reference point) to the end of the drillstring (e.g. the bit 160) and back to a return reference point. The return reference point may be the start of the borehole 165, the point where fluid in the return line reaches atmospheric pressure, or another point. The end of the drillstring may or may not correspond to the bottom of the borehole 165. The processor 180 may be provided with or determine the TVD of the borehole 165 to determine the hydrostatic changes in pressure. The processor 180 may be provided with or calculate the measured depth (MD) of the borehole 165 to determine frictional and other pressure changes.

Figure 13:
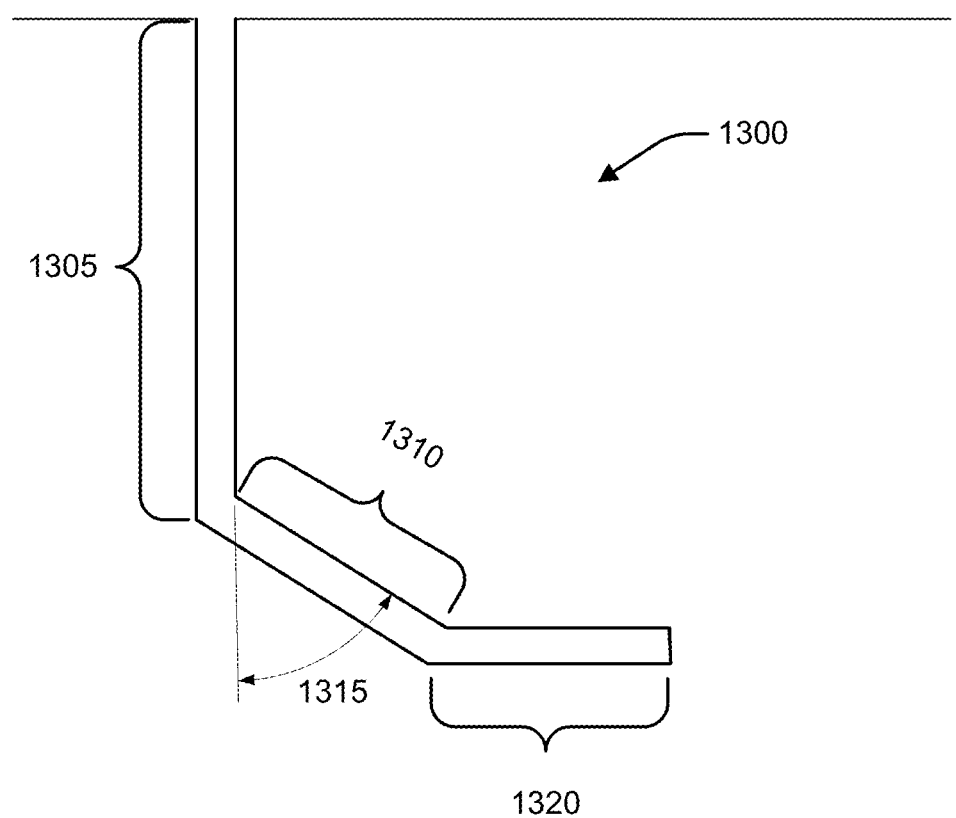
FIG. 13 illustrates a borehole.

An example borehole 1300 that may be modeled by the processor 180 is shown schematically in FIG. 13. The borehole 1300 includes a vertical segment 1305, a "tangent section" segment 1310 disposed to the vertical portion 1305 at angle 1315, and a horizontal segment 1320. A borehole 1300 with a cased vertical segment 1305 of 3000 feet, an uncased segment 1310 of 3000 feet, an angle 1315 of 60 degrees, and an uncased horizontal segment 1320 of 2000 feet will serve as the basis of upcoming examples. This example borehole description is simplistic, but demonstrative for purposes of discussing examples of the system. Actual boreholes may include other geometric features including curve sections. The curve sections may form transitions between straight segments or the curve sections may take the place of one or more straight segments. Other example boreholes may include complex well paths. Other borehole features may be considered when modeling the borehole 165. Such features may include inner and outer pipe diameters, hole diameters, formation types, and bit geometry.

Figure 14:
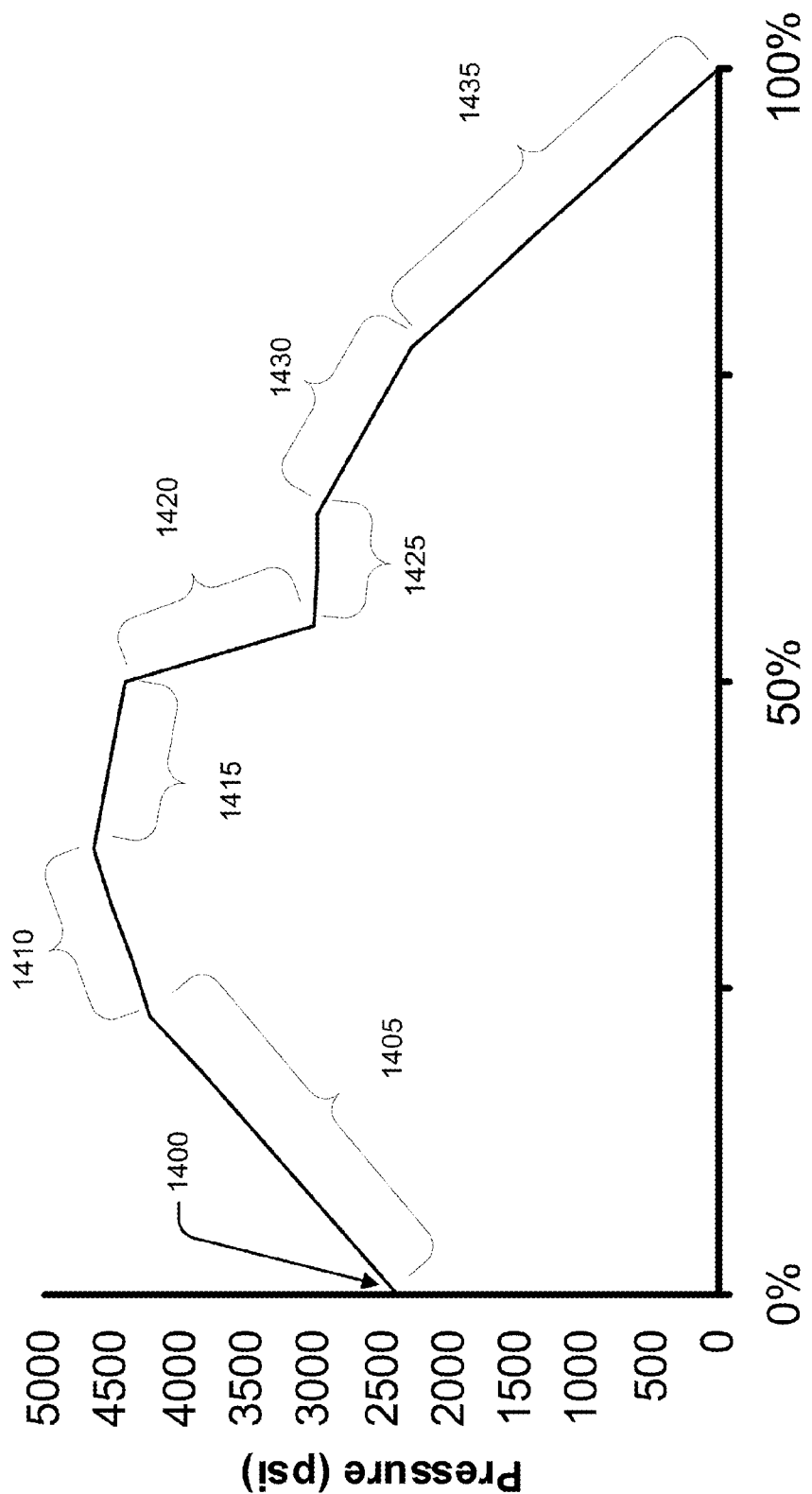
FIGS. 14 and 15 illustrate pressure-versus-depth plots of a set of data.

An example expected-pressure set based on borehole 1300 having dimensions described above is shown in FIG. 14. The lines shown in FIG. 5 may represent underlying data points (e.g., pressure-versus-depth). This example expected-pressure set assumes a constant flow rate and constant drilling fluid density though the entire round-trip distance, although such constancy is not always the case in practice and is not a limitation. The expected-pressure set shows static pressure, including hydrostatic pressure versus the percentage of round-trip distance. Standpipe pressure 1400 is the pressure within the drillstring at zero depth. Pressure segment 1405 represents the pressures in the drillstring through the vertical borehole segment 1305. Pressure segment 1410 represents pressures within the drillstring through the 60 degree borehole segment 1310. Pressure segment 1415 represents pressures within the drillstring through the horizontal borehole segment 1320. Pressure segment 1420 represents pressures through BHA elements. In this example, the BHA elements include MWD/LWD tools 150, a rotary steerable tool, and drill bit 160. Pressure segment 1425 represents the annular pressure (i.e., the pressure outside the drillstring) through the horizontal borehole segment 1320. Pressure segment 1430 represents the annular pressure though borehole segment 1310. Pressure segment 1435 represents the annular pressure through the borehole segment 1305.

Each of pressure segments in an expected-pressure set may change based on the configuration of the drillstring. For example, the drillstring may include one or more subs 155 or MWD/LWD tools 150 that may cause internal flow restriction relative to the drillpipe 140. In such a situation, the expected pressure profile may consider the subs 155 and the MWD/LWD tools 150 and their location along the drillstring (e.g., within different borehole segments) when determining the expected-pressure set. The processor 180 may alter the expected-pressure set to account for pressure changes caused by subs 155 or the MWD/LWD tools 150 in the pressure segment where the subs 155 or the MWD/LWD tools 150 are located. The expected-pressure profile may also account for resulting pressure changes to the segments upstream of the subs 155 and the MWD/LWD tools 150. The expected-pressure set may reflect gradient and pressure loss relationships.

Figure 15:
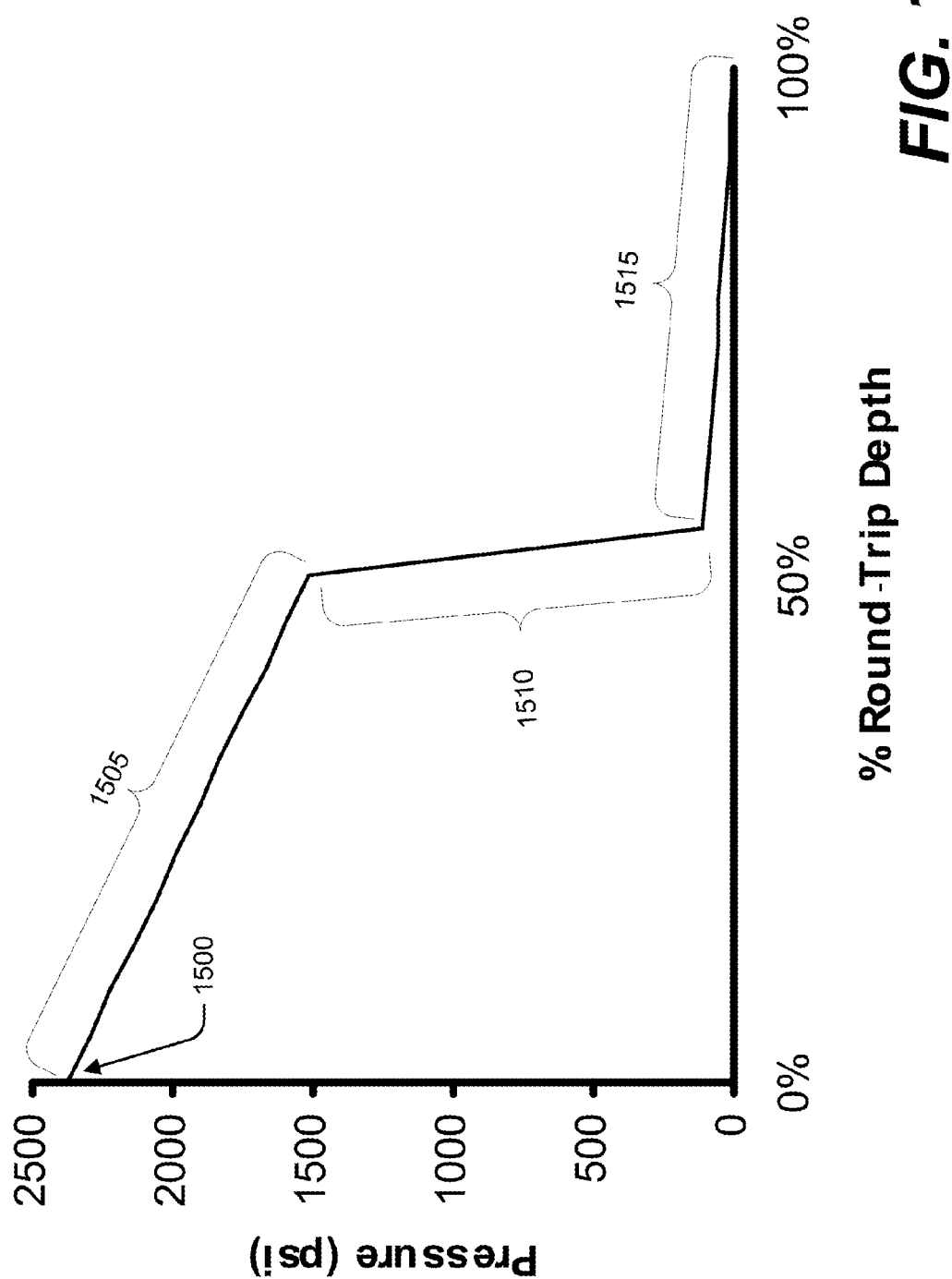

Another example expected-pressure set based on borehole 1300 with dimensions described above is shown in FIG. 15. The example expected-pressure set also assumes a constant flow rate and constant drilling fluid density though the entire round-trip depth. The expected-pressure set shows static pressure, excluding hydrostatic pressure, which may be modeled and subtracted out, versus the percentage of round-trip distance. Standpipe pressure 1500 represents the pressure at zero depth. Pressure segment 1505 represents pressures within the drillstring though borehole segments 1305, 1310, and 1320. Pressure segment 1510 represents pressures through MWD/LWD tools 150, a rotary steerable tool, and drill bit 160. Pressure segment 1515 represents annular pressure through borehole segments 1305, 1310, and 1320.

Returning to FIG. 12 and referring to system elements shown in FIG. 1, once the drillstring has entered to the borehole 165, the processor 180 receives pressure measurements from one or more pressure sensors 175 (block 1210). The processor 180 creates a measured-pressure set (block 1215). The processor 180 may determine one or more measured-pressure gradients (i.e., the change in measured pressure-versus-depth). Certain example implementations include at least three pressure sensors 175 to provide at least two pressure gradients. Certain example implementations include at least one pressure gradient corresponding to each of at least two sections of the flow path or borehole, such sections corresponding, for example, to: (a) ranges of hole angle (e.g. vertical, curve, tangent, horizontal sections); (b) lengths of common average cross-sectional flow area (e.g. over collars, over heavyweight pipe, over drillpipe, in different casing diameters or hole diameters); (d) lengths of borehole exposure to one or more particular formation types; or (d) cased versus open hole.

In certain example implementations, the processor may not determine the one or more gradients (block 1220). For example, if the processor 180 is detecting at least one downhole condition which can be detected by observing absolute differences between one or more measured pressures, or between one or more measured pressures and one or more expected pressures, it may not determine the one or more gradients.

The number and location of the pressure sensors 175 may affect the number of pressure-versus-depth data points available in the measured-pressure set. Additionally, any pressure sensor 175 that is moved from one location to another (e.g. during drilling or tripping) may provide multiple data points in a measured-pressure set.

At least two pressure-versus-depth data points may be used to determine a measured-pressure gradient. Where actual pressure-versus-depth data points are not available, the processor 180 may estimate one or more pressure-versus-depth data points. The processor 180 may estimate pressure-versus-depth data points by interpolating between data points, extrapolating gradients, or determining transitions between gradients.

In certain example system, the measured-value set of pressures, the expected-value set of pressures, or both may be displayed to the operator using the terminal 185. For example, the measured-value set of pressures may be juxtaposed to the expected-value set of pressured using the terminal 185, allowing the user to manually detect, identify, characterize, or locate a downhole condition. The measured-value sets and the expected-value sets may be presented to the user in a graphical format (e.g., a chart, log, plot, or series of plots) or in a textual format (e.g., a table of values). Certain example systems may include presenting an evolution of one or more of the measured-value sets of pressures and the expected-value sets of pressures to the user. For example, the system may display a series of plots to the user to demonstrate the evolution of one or more of the measured-value sets of pressures and the expected-value sets of pressures. The system may display an evolution of both the measured-value set of pressures and the expected-value set of pressures. Certain evolutions may be evolutions over time, depth, or other variables or combinations of variables.

Individual measured pressures in the measured-pressure set may be measured in a short time window (e.g. seconds) for minimized delay in detecting of conditions. In many implementations individual measured pressures in the measured-pressure set may be measured substantially simultaneously. As used herein, "substantially simultaneously" means only that the measurements are taken in the same time period during which conditions are not expected to change significantly, in the context of the particular operational process. For example, during drilling or in-slips, and during constant flow periods (i.e., either when the pumps are on and steady or when they are off), a measured-pressure set may include relevant pressure characteristics between the individual depths, even if the individual pressures are obtained tens of seconds or even minutes apart. Many downhole conditions (e.g., cuttings build-up) may be detected using measured-pressure sets, the values of which are obtained in a time window of minutes. During transient operational processes such as tripping or transitioning flow rate, and for detection of events or conditions which have a faster time constant (e.g. gas influx), a shorter time window for collecting and analyzing a measured-pressure set may be preferred.

Individual measured pressures in the measured-pressure set may be measured sequentially. In some example implementations, the sequence by which the pressures are measured may be controllable by, for example, the processor 180. For example, the sequence by which the pressure are measured may be determined by an algorithm based on drilling conditions or other factors.

Example systems may provide measured versus expected pressures, profiles, or gradients in different operational processes of well construction, including, for example and without limitation: on-bottom rotary drilling, sliding, tripping, off-bottom circulating for hole cleaning, circulating up a kick, circulating pills or transitioning mud types, and leak-off testing.

Figure 16:
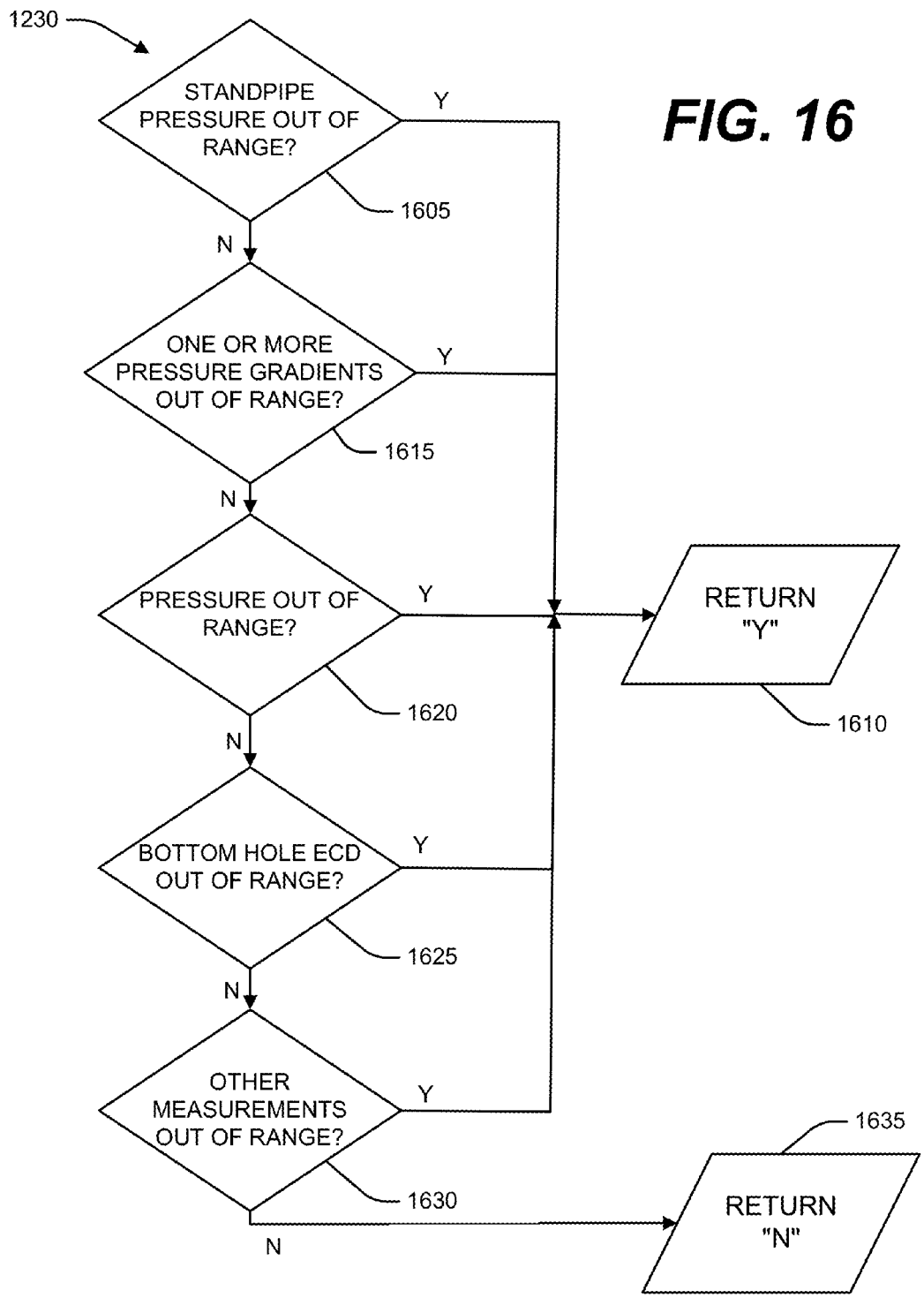
FIG. 16 shows a block diagram of a system for detecting at least one downhole condition.

An example system for determining if there is a downhole condition (block 1230) is shown in FIG. 16. In general, a downhole condition may include any regular or irregular, static or dynamic, condition or event along a round-trip fluid path. Example downhole conditions may include, but are not limited to, one or more of the following: a flow restriction, a cuttings build-up, a wash-out, or an influx. The processor 180 may determine if the measured standpipe pressure is out of range (block 1605), if one or more measured-pressure gradients are out of range (block 1615), if another measured pressure is out of range (block 1620), if a measured bottom hole equivalent circulating density (ECD) is out of range (block 1625), or if other measurements are out of range (block 1630). If none of these quantities are out of range the processor returns "N" (block 1635), otherwise it returns "Y" (block 1610).

The processor 180 may determine whether any of the quantities are out of range (blocks 1605-1630) by determining if the difference between the measured property (e.g., measured static pressure or static pressure gradient) and the expected property (e.g., expected static pressure or static pressure gradient) is greater than a maximum delta for the property.

In certain implementations, the maximum delta may be determined automatically by the processor 180. In other implementations the maximum delta may be input by an operator. In other implementations, the maximum delta may be obtained from a separate processor or model. In certain implementations, the maximum delta may be determined by an operator or an independent model based on one or more measured pressures.

The maximum delta determination may be based on an absolute difference versus an expected value, or it may be based on a percentage deviation from the expected value. The maximum delta may be based upon a function. For example, the maximum delta may increase or decrease with depth. The maximum delta may vary over a depth range or over an operational phase. For example, the maximum delta may be adjusted for a certain depth interval due to narrow pore pressure-fracture gradient window. The maximum delta determination may also be dependant on time. In certain implementations, a difference between a measured pressure and an expected pressure exceeding the maximum delta may be not be acted on unless it persists for a particular duration or longer.

Returning to FIG. 12, if the processor 180 determines that there is not a downhole condition (block 1230) it may modify the expected-pressure set (block 1245) and return to block 1205. In certain implementations, the processor may not execute block 1245 without operator input (e.g., review, approval, input, or intervention). In other implementations, block 1245 may be executed without operator intervention. In one example system, the processor 180 modifies the expected-pressure set based on more or more parameters or parameter sets (e.g. actual pressure gradients) observed or measured downhole. Such an update may provide accounting in the new expected-pressure set for new or updated fluid or flow path circumstances (e.g. increased hole depth, changed fluid density, changed rate of penetration and/or cuttings removal) but which are not deemed downhole conditions (block 1230).

If the processor 180 determines that there is a downhole condition (block 1230), it may identify the condition (e.g. determine the type condition detected), it may characterize the downhole condition (e.g. determine the magnitude or other properties of the downhole condition), and it may locate the position of the downhole condition (e.g. determine the depth or depth interval of the detected condition) (block 1235), and it may take additional actions (block 1240).

Figure 17:
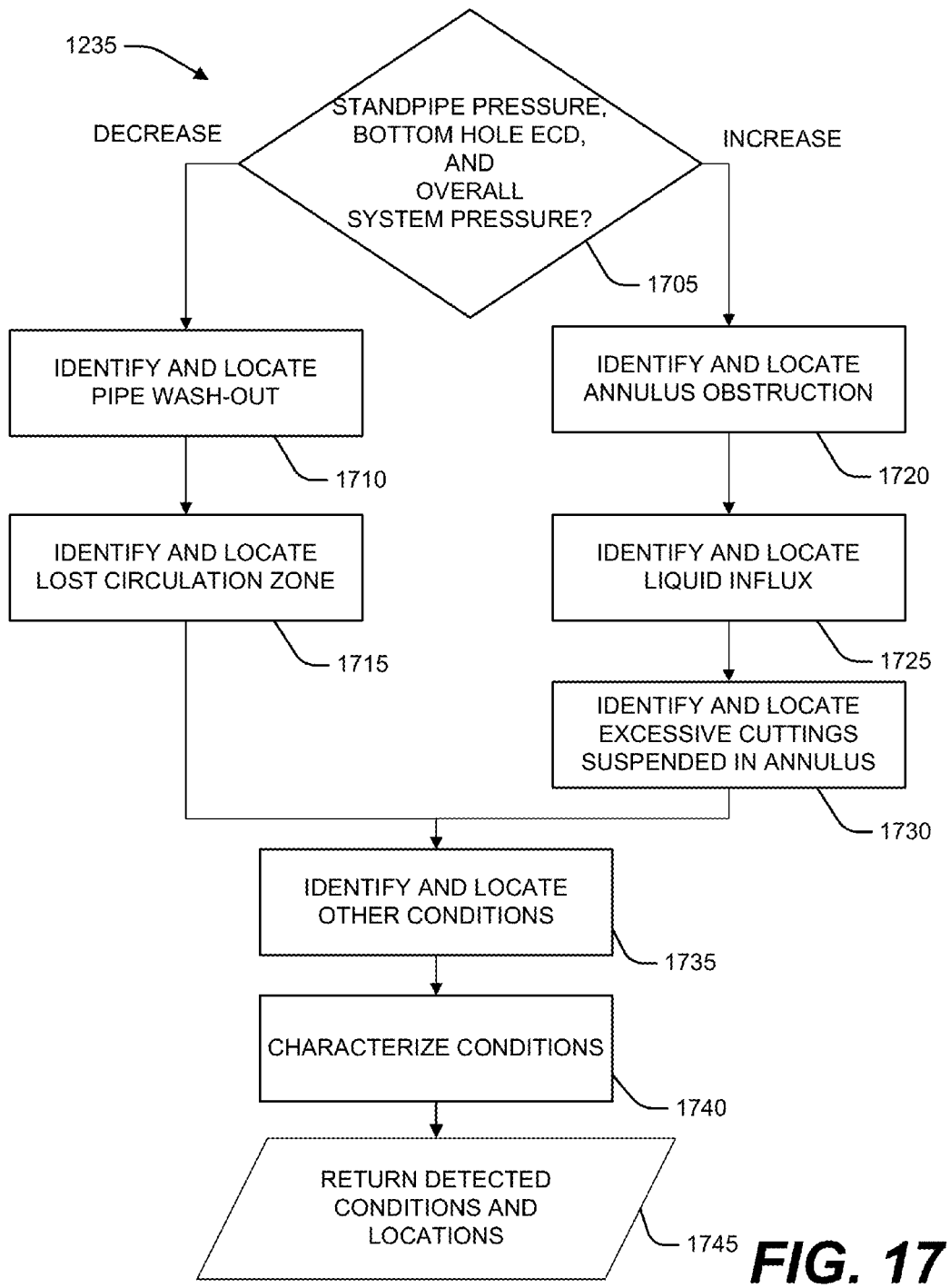
FIG. 17 shows a block diagram of a system for identifying, locating, and characterizing at least one downhole condition.

An example system for identifying, locating, and characterizing at least one downhole condition (block 1235) is shown in FIG. 17. The processor 180 may determine if the measured standpipe pressure, measured bottom hole annular pressure (sometimes expressed as equivalent circulating density (ECD)), or other measured drillpipe or annulus pressures are increased or decreased relative to the expected values (block 1705). If the measured pressures are decreased relative the expected values, the processor 180 may identify and locate one or more of the following downhole conditions: a pipe wash-out (block 1710) or a lost circulation zone (block 1715). If, however, the measured pressures are increased relative to the expected values, the processor 180 may identify and locate one or more of the following downhole conditions: an annulus obstruction (e.g., cuttings build-up) (block 1720), a liquid influx (block 1725), or excessive cutting suspended in the annulus (block 1730). In certain example systems, the processor 180 may perform one or more of identifying, locating, or characterizing the at least one downhole condition. The processor 180 may identify and locate one or more other downhole conditions (block 1735). The processor 180 may characterize the at least one downhole condition (block 840). These downhole conditions may be characterized by increasing or decreasing pressures, or other characteristics, which the system may identify, characterize, or locate. The processor may return one or more of the identification, location, and characteristics of detected downhole conditions (block 1745).

Figure 18:
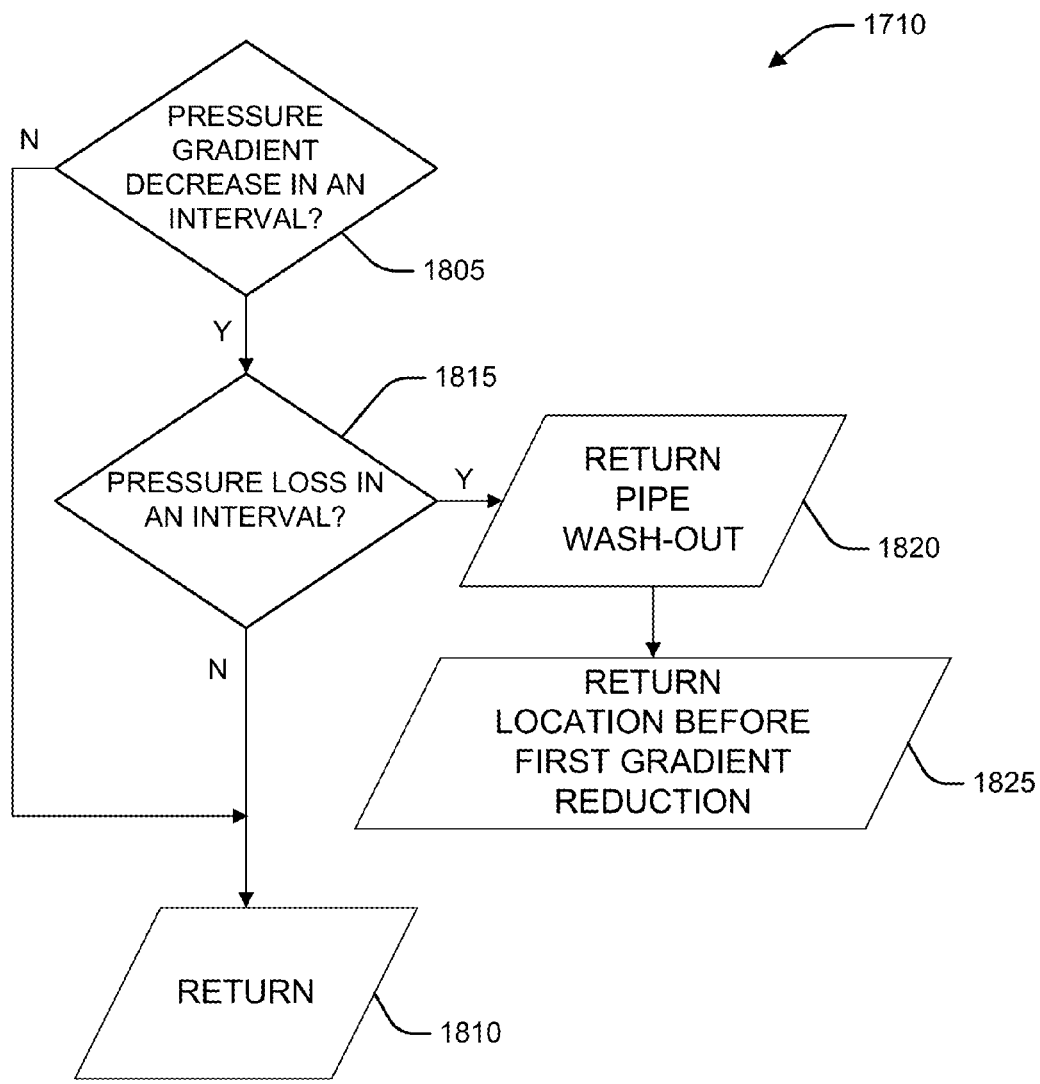
FIG. 18 shows a block diagram of a system for identifying and locating a downhole condition.

An example system for identifying and locating a pipe wash-out (block 1710) is shown in FIG. 18. In a wash-out condition the full flow rate upstream of the wash-out may be divided at the wash-out location, with a portion continuing along the intended drillstring path to the bit 160 and back to surface through the annulus, while a portion of the fluid takes a "short circuit" path directly to the annulus and back to surface. Pressures and pressure gradients may change accordingly from the expected (e.g., non-wash-out) values. For example, a frictional loss pressure gradient within the drillstring may be decreased downstream of the wash-out location. The processor 180 may determine if there is a pressure gradient decrease (e.g., measured-pressure gradient is less than expected-pressure gradient) in a depth interval (block 1805) and, if not, may return nothing (block 1810). Otherwise, the processor 180 may determine if there is a pressure loss (e.g., measured pressure is less than expected pressure) in an interval and, if not, may return nothing (block 1810). Otherwise, the processor 180 may return "PIPE WASH-OUT" as an identification of the likely downhole condition (block 1820). The processor 180 may return the likely location of the downhole condition as upstream of the first measured-pressure gradient reduction relative to the expected-pressure gradient (block 1825). The additional actions in response to the wash-out condition (FIG. 12, block 1240) may include rapidly tripping pipe out of hole to the location of the likely wash-out condition, without a requirement to inspect every connection during the tripping process for possible wash-out.

Figure 19:
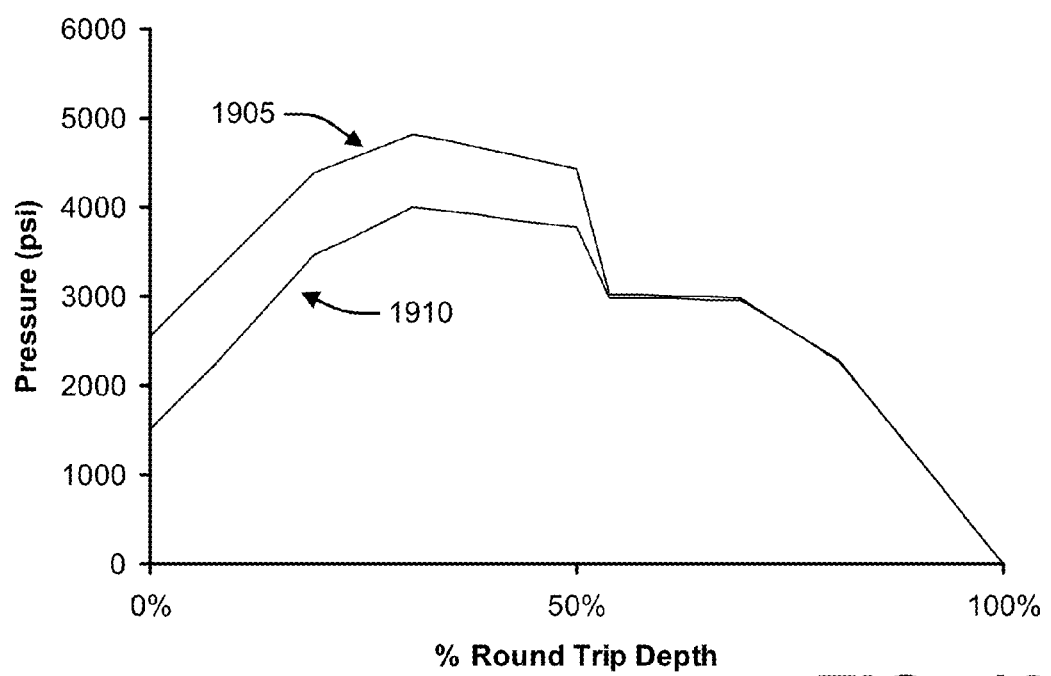
FIGS. 19-21 illustrate pressures versus depth for value sets.
Figure 20:
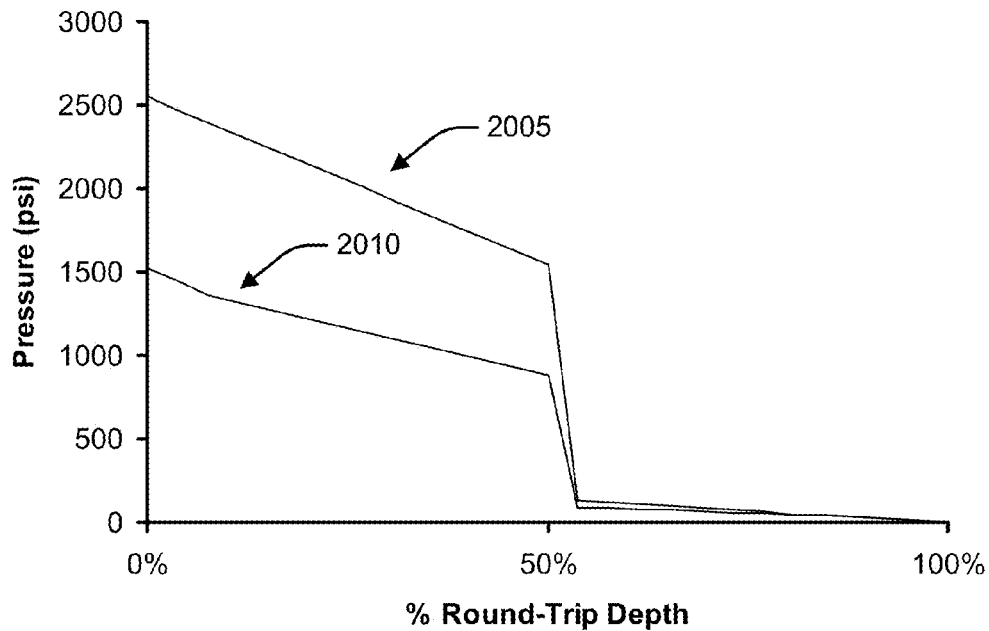
Figure 21:
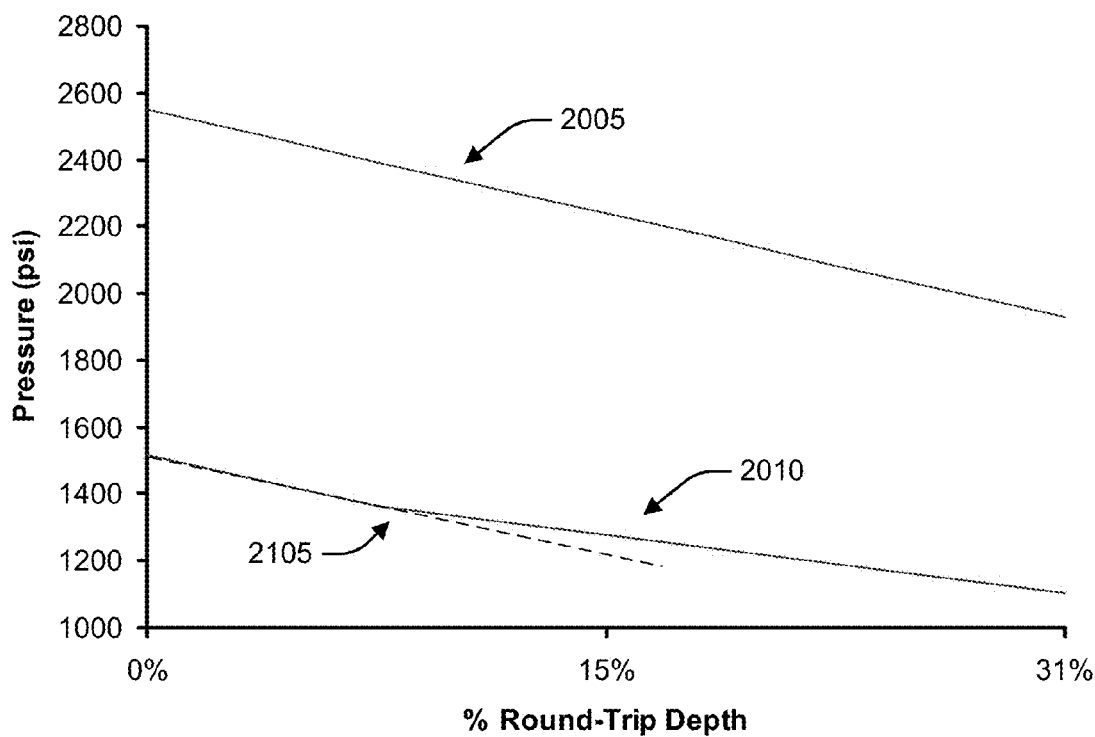

An example measured-value set (1910) and expected-value set (1905) demonstrating a possible pipe wash-out condition is shown in FIGS. 19-21. FIG. 19 shows pressure (including hydrostatic pressure) versus round-trip distance representations of the sets. The expected-value set in FIGS. 20-21 is represented by plot 2005, while the measured-value set is represented by plot 2010. FIGS. 20-21 show pressure (excluding hydrostatic pressure) versus round-trip distance representations of the sets. FIG. 21 is scaled to the area of interest. The inflection point 2105 represents the location of the pipe wash-out.

Using the data shown in FIGS. 19-21, the processor 180 may observe the decrease in the measured-pressure gradient as compared to the expected-pressure gradient, which is particularly evident in FIGS. 20 and 21 (block 1805). The processor 180 may also observe the measured pressure drop over an interval, which is evident in all three figures (block 1810). Based on these observations, the processor may identify the condition as a pipe wash-out. The processor 180 may also observe where the measured pressured gradient begins to decrease to determine that the location of the condition is upstream of or at the depth at inflection point 2105 in FIG. 21. FIG. 21 includes a broken line to demonstrate the change in the measured-pressure gradient at the inflection point 2105. The processor 180 may locate the pipe wash-out at the location upstream of or at the inflection point 2105 (block 1825).

Figure 22:
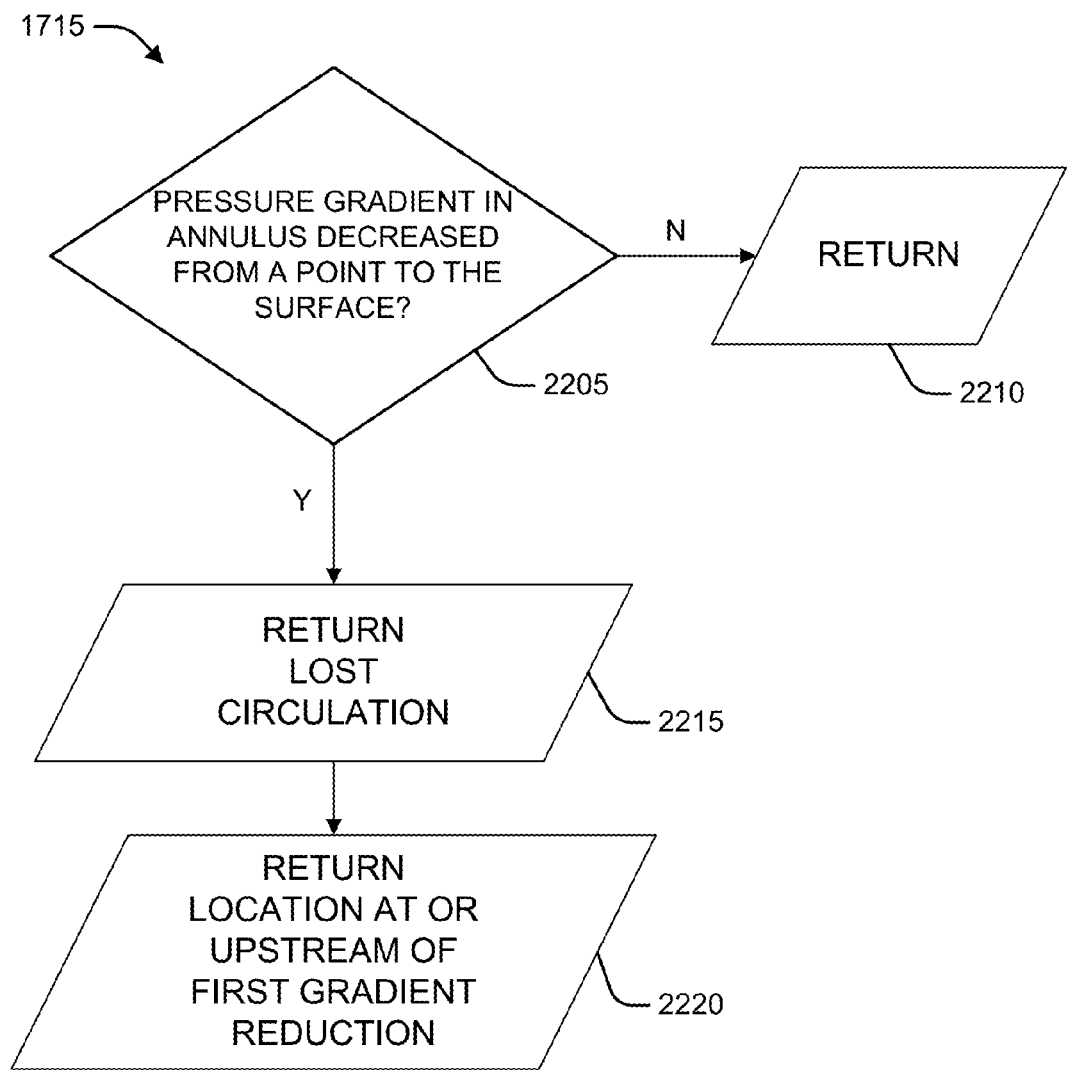
FIG. 22 shows a block diagram of a system for identifying and locating a downhole condition.

An example system for identifying and locating lost circulation (e.g., fluid escaping into the formation) (block 1715) is shown in FIG. 22. In a lost circulation condition a total flow rate from upstream of the lost circulation location or zone along the annulus return path may be divided, with all or a portion of the circulation being lost to the formation and the remainder continuing downstream along the intended return path to surface. Pressures and pressure gradients may change accordingly from the expected (e.g., non-lost circulation condition). For example, a frictional loss pressure gradient may be reduced downstream of a lost circulation zone. The processor 180 may determine if there is a measured-pressure gradient in the annulus that is decreased from a point to the surface (block 2205) and, if so, the processor 180 may return "LOST CIRCULATION" as a likely identification of the downhole condition (block 2215) and may return a location at or upstream of the first measured gradient reduction as the location of the condition (block 2220). Otherwise, the processor 180 may return nothing (block 2210).

Figure 23:
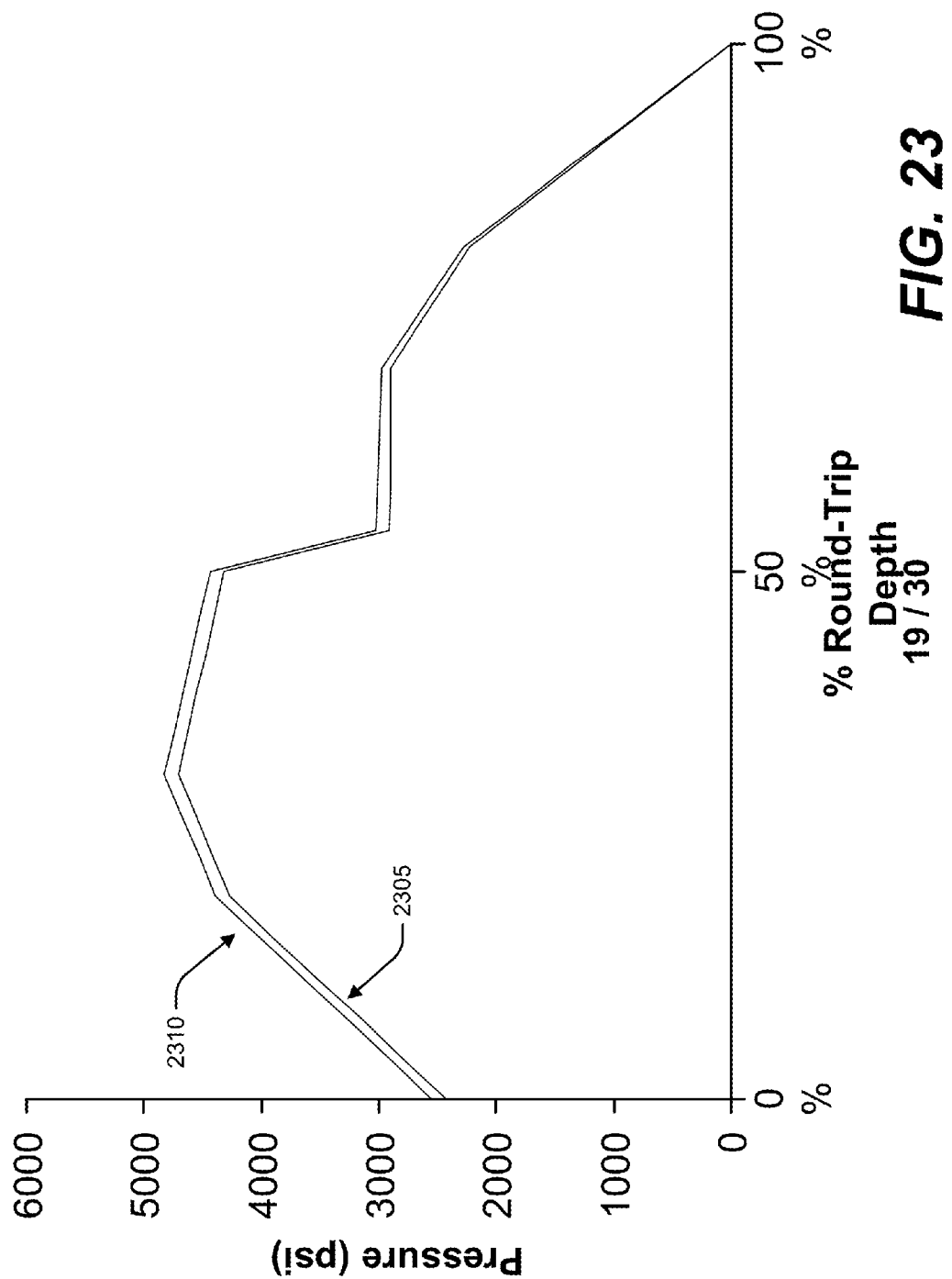
FIGS. 23-24 illustrate pressures versus depth for value sets.
Figure 24:
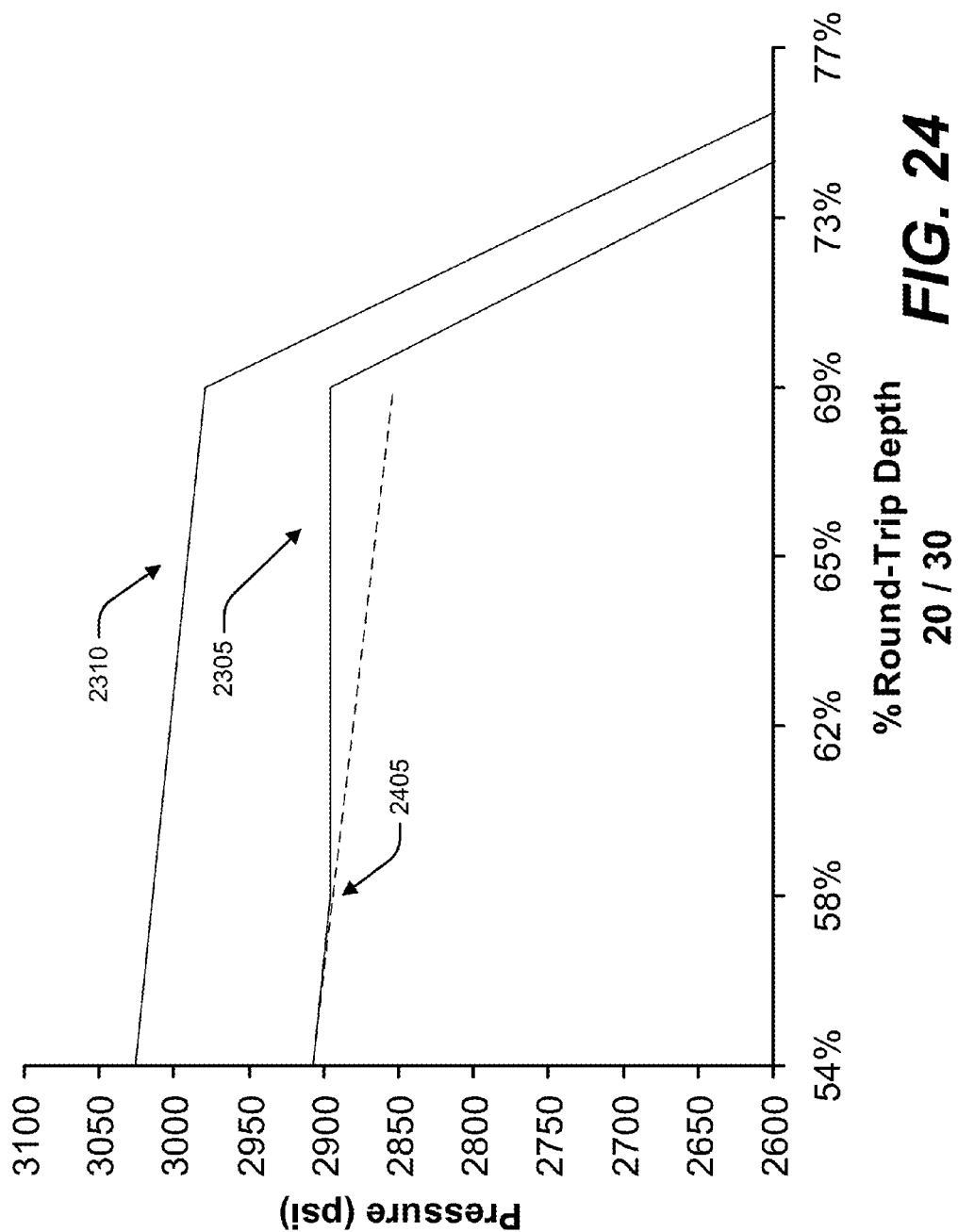

An example measured-value set (2305) and expected-value set (2310) demonstrating a likely lost-circulation condition is shown in FIGS. 23 and 24. FIGS. 23 and 24 show a pressure (including hydrostatic pressure) versus round-trip distance representations of the sets. FIG. 24 is scaled to show the location of the inflection point in the measured-pressure gradient.

Using the data shown in FIGS. 23 and 24, the processor 180 may observe a measured-pressure gradient decrease at inflection point 2405 in FIG. 24 (block 2205). In FIG. 24, the change in gradient is highlighted by the broken line. Based on this observation, the processor 180 may identify the condition as a lost circulation zone (block 2215) and locate the condition at or upstream of the inflection point 2405 (block 2220).

Figure 25:
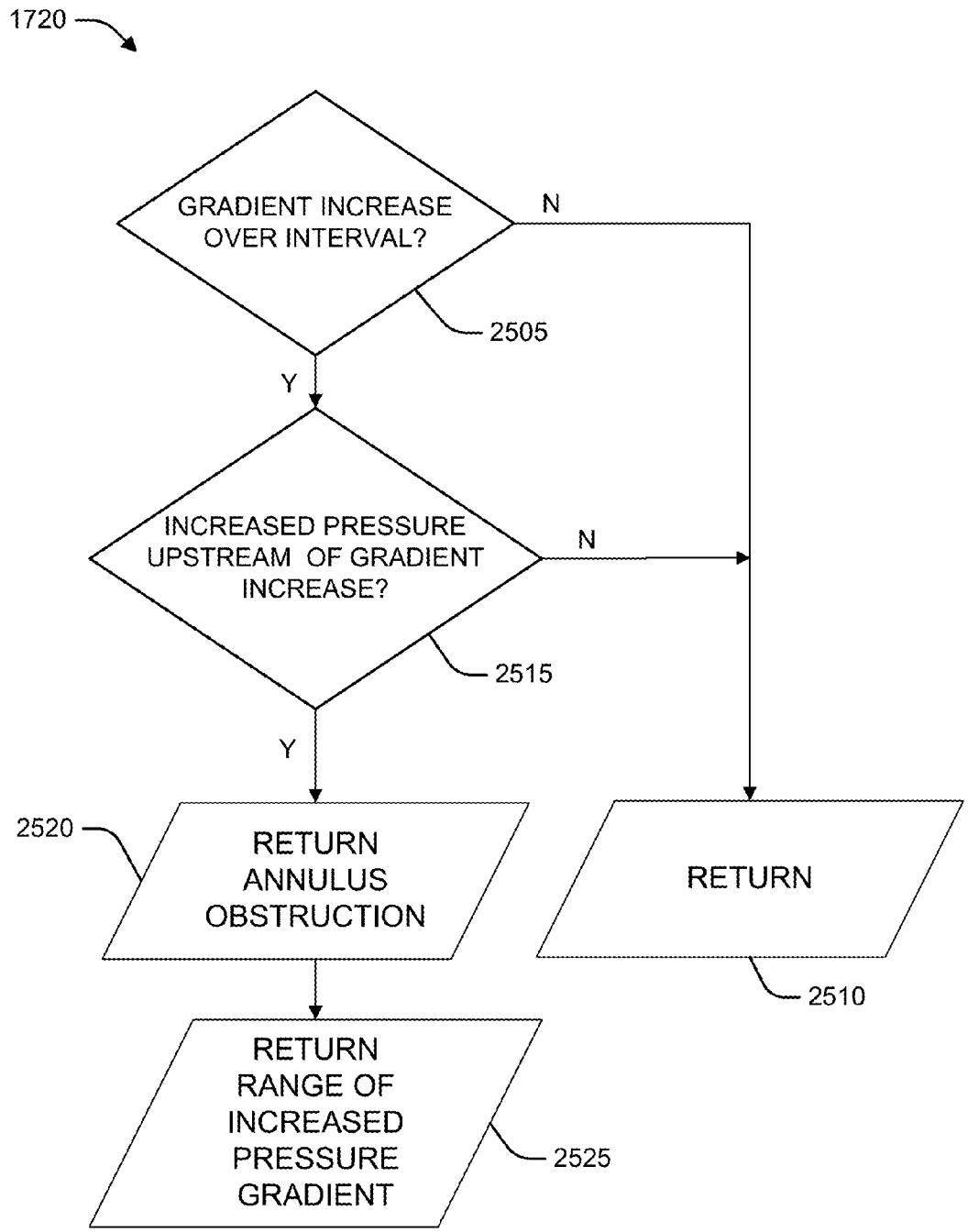
FIG. 25 shows a block diagram of a system for identifying and locating a downhole condition.

An example system for identifying and locating a likely annulus obstruction (block 1720) is shown in FIG. 25. An annulus obstruction condition may be due to cuttings build-up, swelling shale, or other condition restricting flow over an interval. The processor 180 may determine if there is a measured-pressure gradient increase over an interval (block 2505) and if there is an increased measured pressure upstream of the gradient increase (block 2515). If either of these are not true the processor 180 may return nothing (block 2510). Otherwise, the processor 180 may return "ANNULUS OBSTRUCTION" as a likely identification of the downhole condition (block 2520) and may return the depth range corresponding to the range of increased measured-pressure gradient as the likely location of the condition (block 2525).

Figure 26:
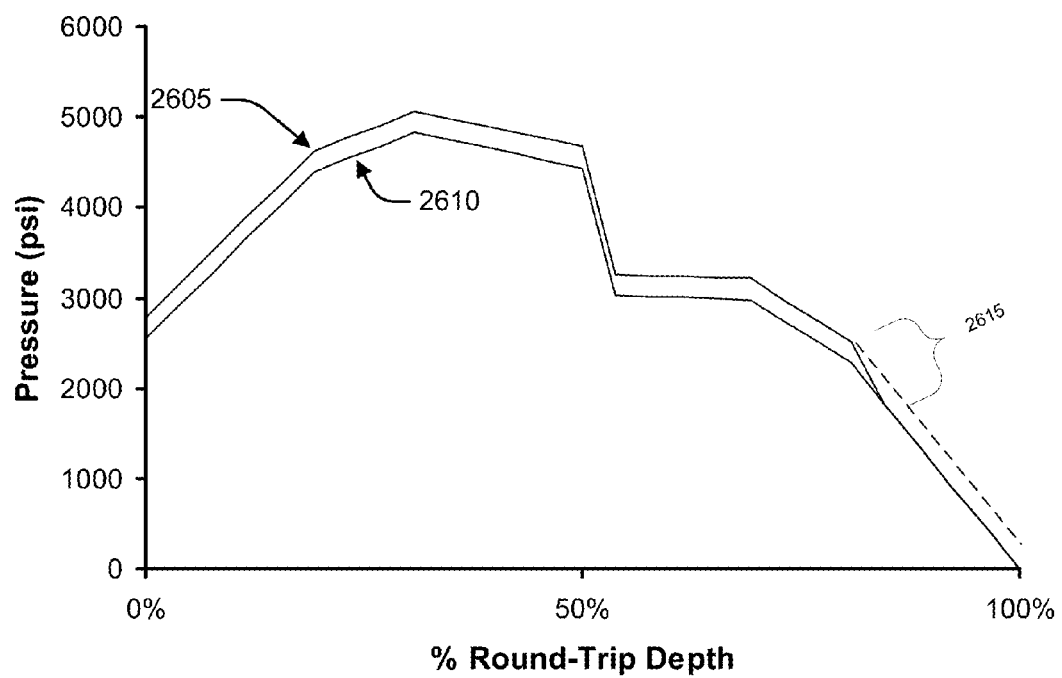
FIG. 26 illustrates pressures versus depth for value sets.

An example measured-value set (2605) and expected-value set (2610) demonstrating an annulus obstruction condition is shown in FIG. 26. FIG. 26 shows a pressure (including hydrostatic pressure) versus round-trip distance representations of the sets.

Using the data shown in FIG. 26, the processor 180 may observe an increase in the measured-pressure gradient over an interval 2615 (block 2505) and increased measured pressure upstream of the interval 2615 (block 2515). The expected-pressure gradient is shown by a broken line in the figure. Based on these observation, the processor 180 may identify the particular condition as an annulus obstruction (block 2520) and may locate the condition at the range of increased measured-pressure gradients (block 2525).

Figure 27:
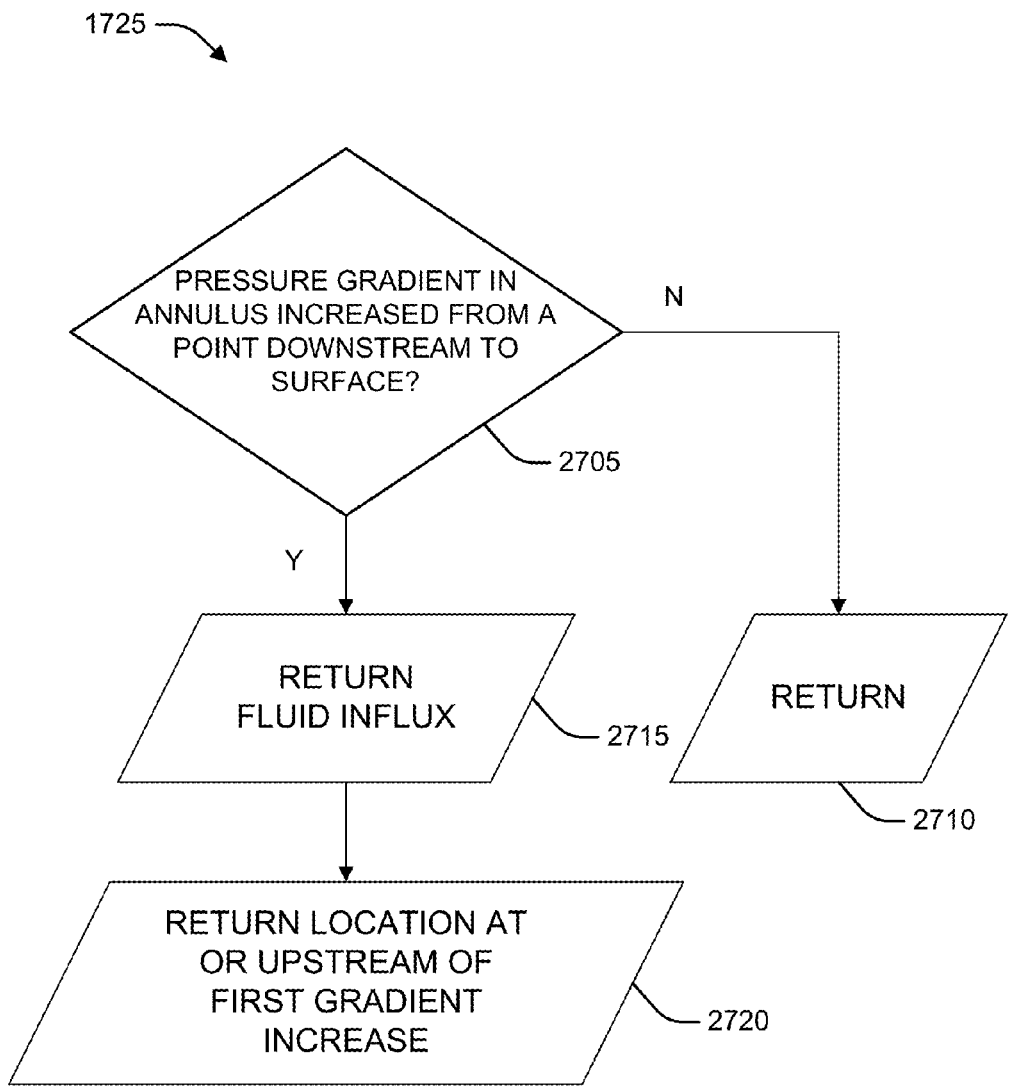
FIG. 27 shows a block diagram of a system for identifying and locating a downhole condition.

An example system for identifying and locating a fluid influx into the drillstring (block 1725) is shown in FIG. 27. Note for purposes herein "fluid influx" means a liquid fluid influx such as a water or oil; gas influx conditions may be a special case considered separately and identified as such. A fluid influx condition may be characterized by a total flow rate from upstream of the influx location or zone along the annulus return path supplemented by additional flow coming into the borehole 165 from the formation. The fluid influx condition may further be characterized by an increased flow rate therefore continuing downstream along the intended return path to surface. Pressures and pressure gradients may change accordingly from the expected (e.g., non-influx condition). For example, a frictional loss pressure gradient may be increased downstream of the influx zone. The processor 180 may determine if there is an increased measured-pressure gradient in the annulus from a point downstream to the surface (block 2705). If so, the processor 180 may return "FLUID INFLUX" as a likely identification of the downhole condition (block 2715) and may return a location at or upstream of the first (i.e., upstream-most) measured-pressure gradient increase as the likely location of the downhole condition (block 2720).

Figure 28:
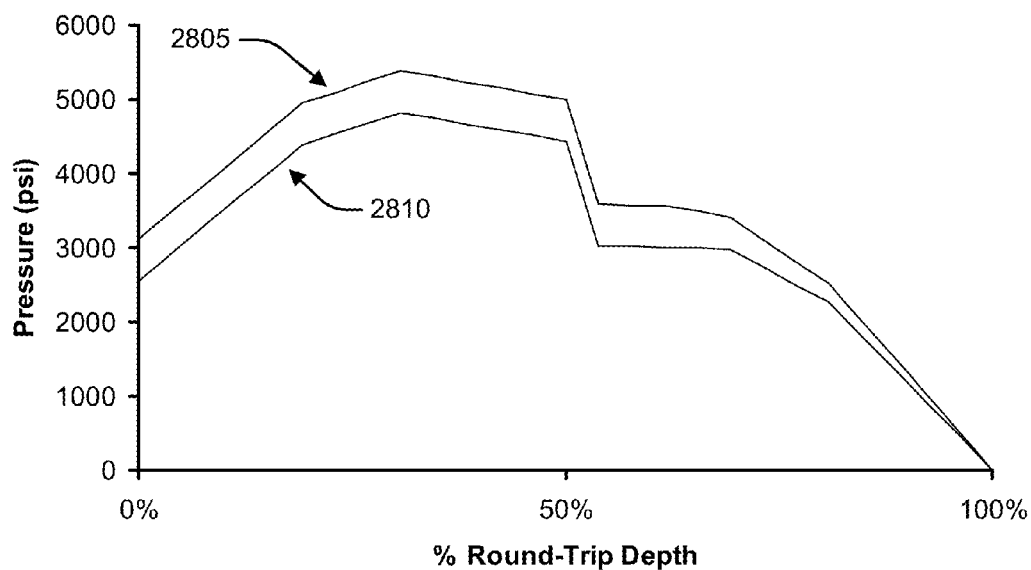
FIGS. 28-29 illustrate pressures versus depth for value sets.
Figure 29:
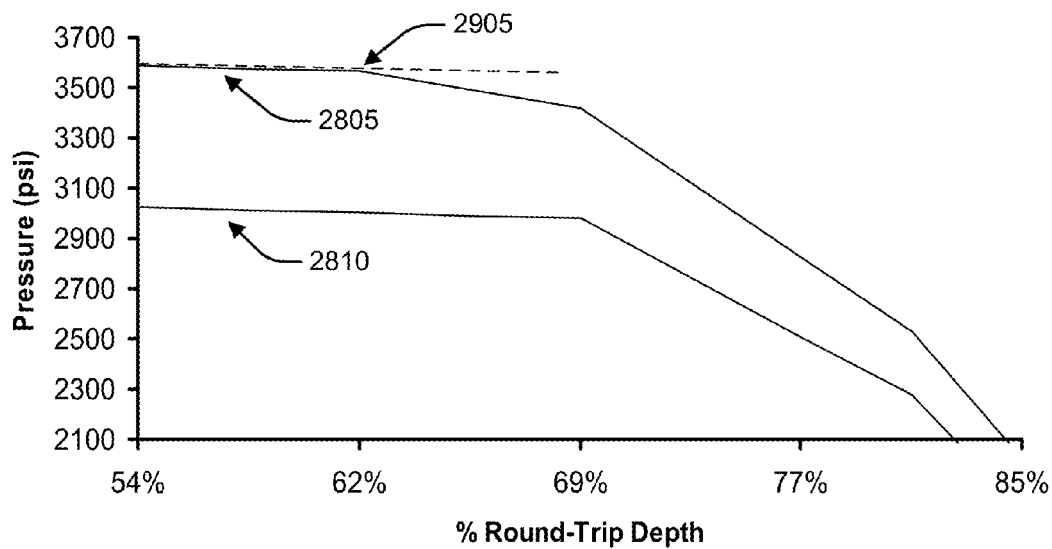

An example measured-value set (2805) and expected-value set (2810) demonstrating a fluid influx condition is shown in FIGS. 28 and 29. FIGS. 28 and 29 show pressure (including hydrostatic pressure) versus round-trip distance representations of the sets. FIG. 29 is scaled to show the location of the inflection point in the measured-pressure gradient.

Using the data shown in FIGS. 28 and 29 the processor 180 may observe an increased measured-pressure gradient in the annulus starting from inflection point 2905 (FIG. 29) and downstream to the surface. Based on this observation, the processor 180 may identify the particular condition as a fluid influx into the drillstring (block 2715) and may locate the condition at or upstream of the first measured-pressure gradient increase (block 2720).

Figure 30:
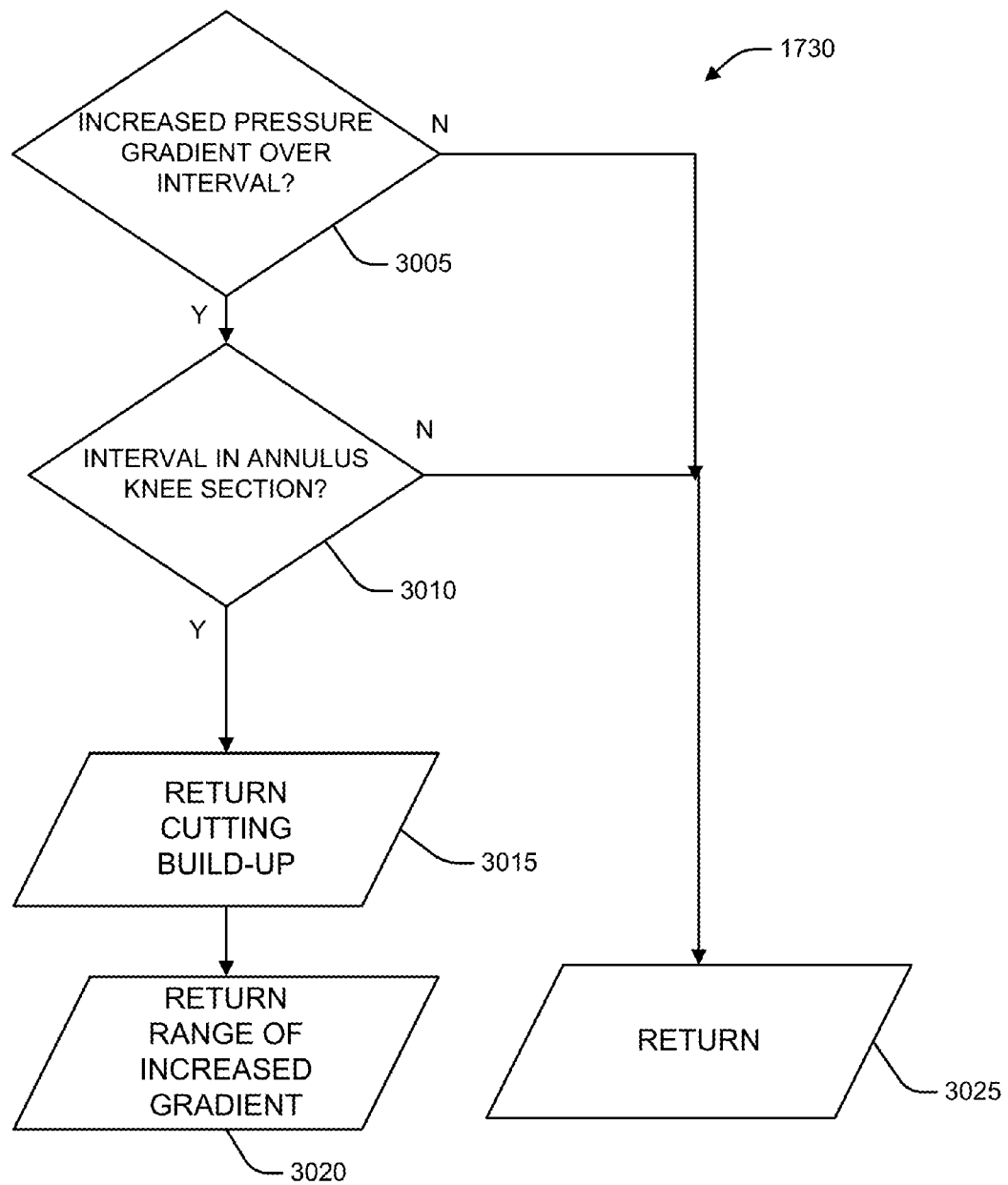
FIG. 30 shows a block diagram of a system for identifying and locating a downhole condition.

An example system for identifying and locating a cutting build-up (block 1730) is shown in FIG. 30. A cuttings build-up may be identified as an annulus obstruction over an interval. Further analysis may more specifically indicate that the obstruction is likely to be a cuttings build-up. The processor 180 may determine if there is an increased pressure gradient over an interval (block 3005). If so, and if the interval is in a particular borehole section known to be susceptible to cuttings build-up, such as the "knee" section in the annulus (i.e., where the horizontal section transitions to the 60 degree section) (block 3010), the processor 180 may return "CUTTING BUILD-UP" as the likely identification of the downhole condition (block 3015) and may return a likely range of the increased measured gradient as the location of the condition (block 3020). Otherwise, the processor 180 may return nothing (block 3025).

Figure 31:
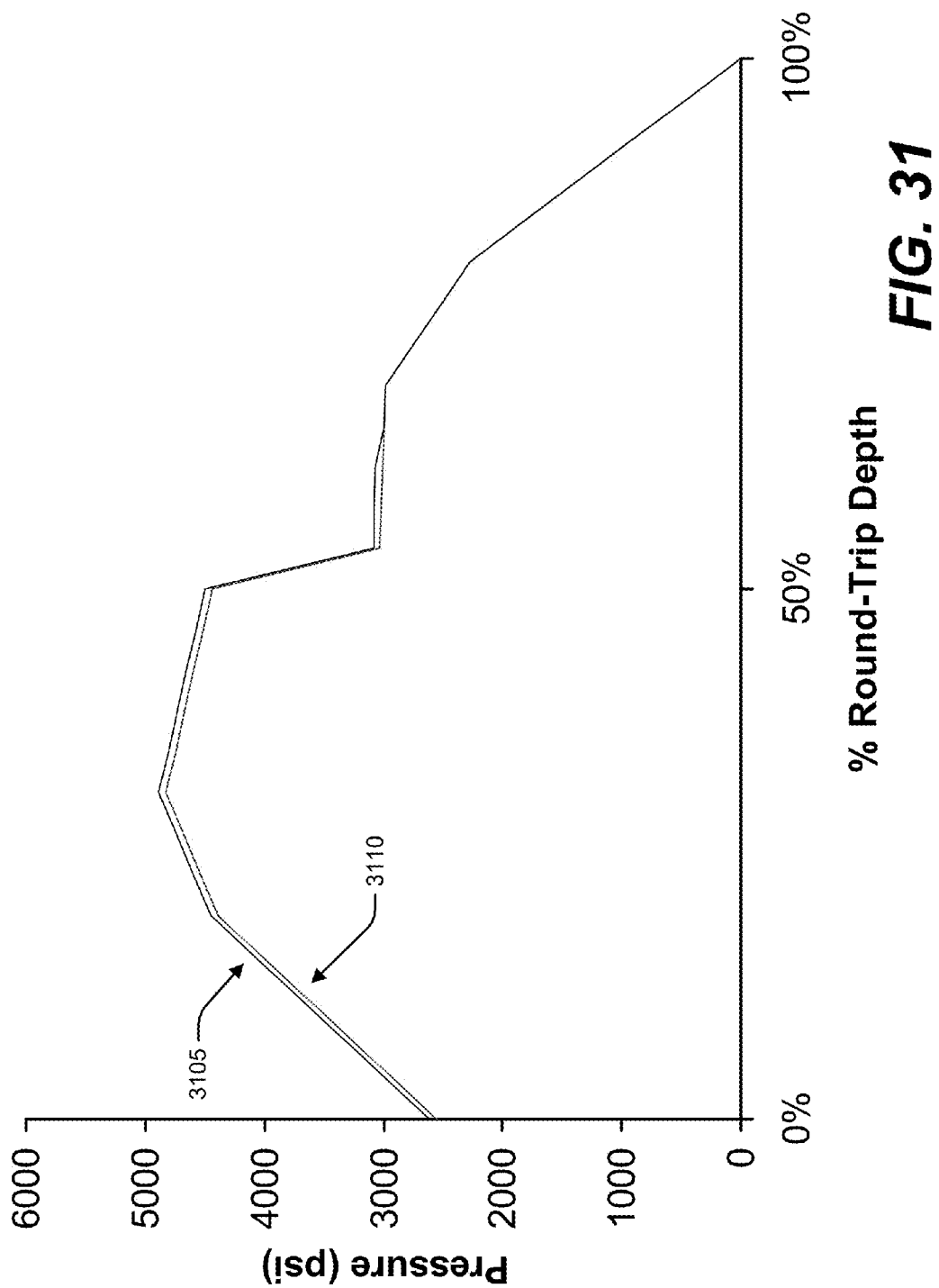
FIGS. 31-32 illustrate pressures versus depth for value sets.
Figure 32:
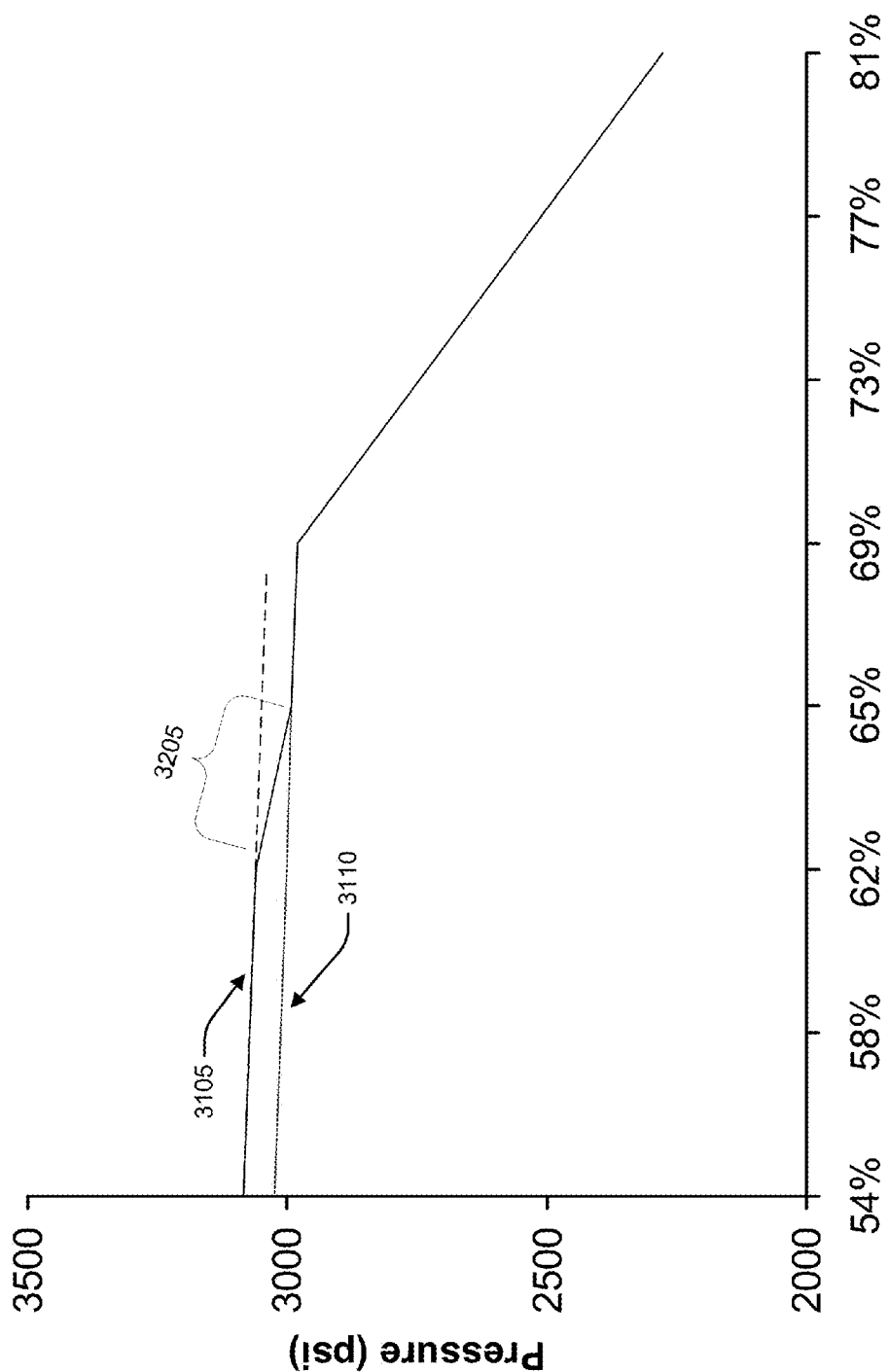

An example measured-value set (3105) and expected-value set (3110) demonstrating the cutting build-up condition is shown in FIGS. 31 and 32. FIGS. 31 and 32 show a pressure (including hydrostatic pressure) versus round-trip distance representations of the sets. FIG. 32 is scaled to show the location of the range of increased measured-pressure gradients.

Using the data shown in FIGS. 31 and 32 the processor 180 may observe increased pressure gradients over an interval 3205 (FIG. 32) (block 3005) and determine that the interval is in the knee between the borehole sections 1310 and 1320 (block 3010). Based on these observations, the processor 180 may identify the condition as a likely cutting build up in the annulus (block 3020) and locate the condition at the range of increase measured-pressure gradients (block 3025).

In certain implementations, one or more pressure sensors 175 may measure annulus static pressures and based on these pressure measurements, the processor 180 may determine that the increase pressure gradient in the interval 3205 reflects increased frictional losses over the interval, which may reflect the increased annular flow velocity and likely cuttings build up. In other implementations, which are not represented in FIGS. 22 and 23, one or more pressure sensors 175 may directly measure stagnation pressure. In such implementations, the processor 180 may determine flow velocities from the stagnations pressure measurements. The processor 180 may determine the flow velocities by relating the stagnation pressure to the square of the fluid velocity.

Returning to FIG. 17, the processor 180 may identify one or more other downhole conditions (block 1735). An example system for determining one or more other downhole condition is shown in FIG. 33. The processor 180 may identify and may locate the depth where the drilling fluid changes phase (e.g., liquid to gas), or inverts from a liquid to gas continuous phase (block 3305). Such example system may be useful for underbalanced drilling systems. The processor 180 may also detect and may locate a gas influx in the annulus (block 3310). A gas influx may result in pressure and gradient changes along the annulus versus the expected-pressure set which while more complex than the case of a liquid influx are still modelable by known methods. The processor 180 may also detect and may locate other conditions that have an effect on downhole pressures (block 3315).

Although the identification and location of downhole conditions has been discussed with respect to normal flow, the system may also identify downhole conditions when operating with reversed flow (e.g. drilling fluid is pumped down the annulus and flows up the drillstring). The processor 180 may detect simultaneous downhole conditions. The processor 180 may separate the pressure indicia of the plurality of downhole conditions using analytical methods. The processor 180 may receive measurements from sources other than pressures sensors mounted to the drillstring to detect at least one downhole condition. For example, the processor 180 may monitor operational data such as the standpipe pressure, rate of penetration, rotary RPM, "in-slips" sensors, hook-load, and the flow rate and other parameters of the drilling fluid, both inbound and outbound.

The downhole conditions may also be characterized by the processor 180 (block 1740). Such characterization may include the determination of a likely magnitude range of the condition. The magnitudes of the measured and expected pressure values and measured and expected-pressure gradients may be indicative (analytically through known hydraulics relationships and/or empirically) of the characteristics of the condition. For example, the particular changes in pressures or gradients may be used to estimate particular percentage of flow bypassing in a wash-out, particular flow rate of a fluid influx, particular lost-flow rate of a lost circulation zone, or particular percentage cross sectional area of an obstruction or a cuttings bedded interval.

The processor 180 may perform additional actions after detecting a downhole condition (block 1240). As shown in FIG. 34, the additional actions may include one or more of the following: sending an alarm (block 3405), offering advice on actions to the operator (e.g. shut-in the borehole, change fluid density, change flow rate, change rotary speed, short trip e.g. for hole cleaning) (block 3410), or sending a control signal to surface or downhole rig equipment or tools responsive to the condition (block 3415). As shown in FIG. 35, for example, the control signal may cause the surface or downhole rig equipment to trip to the location of a problem joint (block 3505). The control signal may additionally or alternatively cause other automated actions. These actions may include, for example: shutting-in the borehole, changing fluid density, changing flow rate, changing rotary speed, or short tripping.

The processor 180 may also modify the expected-pressure set (block 1245), as shown in FIG. 36. The processor 180 may modify the expected-pressure set to account for a detected downhole condition (block 3605). The processor 180 may modify the expected-pressure set to account for other factors, such as those discussed with respect to determining the expected pressure set (block 1205).

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method of collecting and analyzing one or more pressures, comprising:
measuring pressures at a plurality of locations on a drillstring, the drillstring comprising a drillpipe, and where at least one pressure is measured by a pressure sensor located on or within the drillpipe; and
detecting at least one downhole condition based, at least in part, on at least one measured pressure, wherein the at least one downhole condition includes a fluid influx.

2. The method of claim 1, where measuring pressures at a plurality of locations along a drillstring comprises:
measuring at least two of the pressures substantially simultaneously.

3. The method of claim 1, where measuring pressures at a plurality of locations along a drillstring comprises:
measuring at least two of the pressures in a controllable sequence.

4. The method of claim 1, further comprising:
identifying at least one downhole condition.

5. The method of claim 1, further comprising:
locating at least one downhole condition.

6. The method of claim 1, further comprising:
characterizing at least one downhole condition.

7. The method of claim 1, where the drillstring comprises one or more drill collars, and where measuring pressures at a plurality of locations on the drillstring comprises:
measuring one or more pressures at one or more of the drill collars.

8. The method of claim 1, where the drillstring comprises an interior and an exterior, and where measuring pressures at a plurality of locations on the drillstring comprises:
measuring at least one pressure on at least one of:
the exterior of the drillstring; or
the interior of the drillstring.

9. The method of claim 1, where measuring pressures at a plurality of locations on a drillstring comprises:
measuring pressures at three or more locations on the drillstring;

and where detecting at least one downhole condition comprises:
  detecting at least one downhole condition based, at least in part, on three or more measured pressures.

10. The method of claim 1, where measuring pressures at a plurality of locations on a drillstring comprises:
  measuring a first pressure in a first borehole section; and
  measuring a second pressure in a second borehole section, where:
    the first borehole section and second borehole section are different types of borehole sections; and were each of the first borehole section type and the second borehole section type are selected from a group of borehole section types consisting of:
      a vertical section;
      a curve section;
      a tangent section; and
      a horizontal section.

11. The method of claim 1, further comprising:
  creating a measured-value set comprising one or more measured pressures and corresponding depths.

12. The method of claim 11, where at least one of the measured pressures in the measured-value set is measured along a flowline and corresponds to a depth at or near the top of the drillstring.

13. The method of claim 11, where the measured-value set comprises at least three measured pressures and corresponding depths.

14. The method of claim 11, further comprising:
  providing at least two expected pressures along the drillstring corresponding to at least two depths; and
  creating an expected-value set of expected pressures versus depth.

15. The method of claim 14, further comprising:
  displaying at least one graphical representation selected from the group comprising:
    a graphical representation of the measured-value set;
    a graphical representation of the expected-value set; and
    a graphical juxtaposition of the measured-value set and the expected-value set.

16. The method of claim 14, further comprising:
  determining at least one pressure difference between an expected pressure at a depth and a measured pressured at about the depth.

17. The method of claim 16, further comprising:
  detecting at least one downhole condition based, at least in part, on one or more pressure differences.

18. The method of claim 14, further comprising:
  determining at least one measured-pressure gradient;
  determining at least one expected-pressure gradient; and
  determining at least one gradient difference.

19. The method of claim 18, where determining at least one gradient difference comprises:
  determining at least one gradient difference between a corresponding pair of one measured-pressure gradient and one expected-pressure gradient, where each of the measured-pressure gradient and the expected-pressure gradient in the corresponding pair correspond to at least partially overlapping depths.

20. The method of claim 19, further comprising:
  identifying at least one downhole conditions based, at least in part, on one or more gradient differences.

21. The method of claim 1, wherein the at least one pressure measured by a pressure sensor located on or within the drillpipe is measured by a pressure sensor located on or within an interface between two joints of drillpipe.

22. The method of claim 1, wherein the at least one pressure measured by a pressure sensor located on or within the drillpipe is measured by a pressure sensor located on or within a sub between two joints of drillpipe.

23. The method of claim 1, wherein the at least one pressure measured by a pressure sensor located on or within the drillpipe is measured by a pressure sensor located on or within a drillpipe joint.

24. The method of claim 1, wherein the at least one pressure measured by a pressure sensor located on or within the drillpipe is measured by a pressure sensor located on or within a gasket between two joints of drillpipe.

* * * * *